US012779266B2

(12) United States Patent
Zhou

(10) Patent No.: US 12,779,266 B2
(45) Date of Patent: Nov. 3, 2026

(54) SMART FIRE EXTINGUISHER DEVICE, SYSTEM, AND SERVICE PLATFORM

(71) Applicant: Henry Zhou, Sarasota, FL (US)

(72) Inventor: Henry Zhou, Sarasota, FL (US)

( * ) Notice: Subject to any disclaimer, the term of this patent is extended or adjusted under 35 U.S.C. 154(b) by 193 days.

(21) Appl. No.: 18/437,412

(22) Filed: Feb. 9, 2024

(65) Prior Publication Data

US 2025/0256143 A1 Aug. 14, 2025

Related U.S. Application Data

(60) Provisional application No. 63/446,872, filed on Feb. 19, 2023.

(51) Int. Cl.
*A62C 37/40* (2006.01)
*A62C 37/36* (2006.01)
*A62C 37/38* (2006.01)
*A62C 35/08* (2006.01)

(52) U.S. Cl.
CPC .............. *A62C 37/40* (2013.01); *A62C 37/04* (2013.01); *A62C 37/36* (2013.01); *A62C 37/38* (2013.01); *A62C 35/08* (2013.01)

(58) Field of Classification Search
CPC ......... A62C 37/40; A62C 37/04; A62C 37/36; A62C 37/38; A62C 35/08
See application file for complete search history.

(56) References Cited

U.S. PATENT DOCUMENTS 4,885,931 A 12/1989 Horner
5,486,811 A 1/1996 Wehrle et al.
D382,823 S 8/1997 Newland, Jr.
6,796,382 B2 9/2004 Kaimart
D517,439 S 3/2006 Black et al.
D618,516 S 6/2010 DiPietro et al.
D631,379 S 1/2011 Sutton
D736,212 S 8/2015 Kang et al.
D759,002 S 6/2016 Won
(Continued)

FOREIGN PATENT DOCUMENTS

CN 104436482 A 3/2015
CN 105031855 B 3/2018
(Continued)

*Primary Examiner* — Phutthiwat Wongwian
*Assistant Examiner* — Rene D Ford

(57) ABSTRACT

A smart fire extinguisher device includes a fire extinguisher and a monitoring device. The smart fire extinguisher has an ornamental appearance designed to fit indoor environments, a plurality of sensors that can detect ambient conditions, a control module, and an extinguisher module that can be set off by the control module to spontaneously release fire extinguishing agent in preset directions, and a communication module that connects the device to network servers and devices. A smart fire extinguisher system comprises multiple smart fire extinguisher devices each capable of communicating directly with other extinguisher devices of fire hazards detected. A service platform connects with the smart fire extinguishers and monitoring devices to collect sensor data, apply analytic, artificial intelligence, and other decision models to determine if a fire may or already has happened, activate smart extinguisher, and alert customers, fire stations, and other service subscribers in the proximity of the fire.

20 Claims, 13 Drawing Sheets

(56) References Cited

U.S. PATENT DOCUMENTS

| | | | | |
|---|---|---|---|---|
| D760,444 | S | 6/2016 | Kozlowski | |
| D772,604 | S | 11/2016 | Evans | |
| D773,817 | S | 12/2016 | Hower | |
| D778,674 | S | 2/2017 | Hoover et al. | |
| D794,631 | S | 8/2017 | Solomon et al. | |
| D801,314 | S | 10/2017 | Akana et al. | |
| D812,506 | S | 3/2018 | Kalyan et al. | |
| D899,285 | S | 10/2020 | Peterson et al. | |
| 11,080,988 | B2 | 8/2021 | Lim et al. | |
| 11,383,115 | B1 | 7/2022 | Rousseau et al. | |
| 2008/0190627 | A1* | 8/2008 | Koelewijn | A62C 5/006 169/48 |
| 2008/0289831 | A1 | 11/2008 | Kaimart | |
| 2008/0289832 | A1 | 11/2008 | Schimpf et al. | |
| 2018/0169451 | A1 | 6/2018 | Moffa | |
| 2019/0344109 | A1* | 11/2019 | Enk | A62C 37/04 |
| 2020/0226916 | A1 | 7/2020 | Lim et al. | |
| 2022/0228915 | A1* | 7/2022 | Timler | G01J 5/0018 |
| 2022/0355147 | A1 | 11/2022 | Lee | |
| 2024/0278052 | A1* | 8/2024 | Zhang | G08B 25/10 |

FOREIGN PATENT DOCUMENTS

| | | | |
|---|---|---|---|
| CN | 207168887 | U | 4/2018 |
| CN | 208493075 | U | 2/2019 |
| CN | 110575641 | A | 12/2019 |
| CN | 114404853 | A | 4/2022 |
| JP | 2011-501976 | A | 1/2011 |
| WO | WO 2004/014489 | A1 | 2/2004 |

* cited by examiner

SMART FIRE EXTINGUISHER DEVICE, SYSTEM, AND SERVICE PLATFORM

CROSS-REFERENCE TO RELATED APPLICATIONS

This application claims the benefit of U.S. Provisional Application No. 63/446,872, filed on Feb. 19, 2023. The entire disclosure of the above application is incorporated herein by reference.

FIELD

The present disclosure relates to intelligent and automatic fire detection, extinguishment, and fire protection. More particularly, the present disclosures relate to an indoor smart IoT-enabled (IoT: Internet Of Things) fire safety device that is designed to have an aesthetic, ornamental appearance matching and fitting with indoor environments and have smart intelligence to independently and automatically or in a remotely-controlled manner perform automatic fire detection, alerting users, and automatic fire extinguishment; a smart fire firefighting system consisting of a plurality of such smart fire safety devices capable of notifying each other when one device detects fire hazards; a cloud-based SaaS service platform that connects the same smart devices with network servers and end-user monitoring devices to collect and analyze device sensor data, apply data analytic and/or AI models to analyze device ambiance environment, and recognize patterns of fire hazards, for fast, intelligent, and automatic fire detection, alert, suppression, and public fire-response and firefighting; and methods of operating the same smart fire safety device and system independently and/or as network-connected and remotely controlled through the same cloud-based SaaS service platform. The disclosures aim to increase the effectiveness and accuracy of a fire alert, response, and suppression.

BACKGROUND

This section provides background information related to the present disclosure which is not necessarily prior art.

Conventional indoor portable fire extinguishers, especially those used in residential homes, are cylinder-shaped industrial-looking devices. They do not fit or blend well with the home or other indoor environments. People hide them away from plain sight due to the incompatible industrial-looking design styles. Throwable ball-shaped fire extinguishers also do not fit well with most indoor settings as they require mounting brackets and take up extra spaces, which often appear as intruding and unnecessary items in the house. When the fire extinguishers are hidden away, it takes a longer time to locate, retrieve, and activate them when they are needed to put out fires. Throwable ball-shaped fire extinguishers normally cannot be deployed close to potential fire sources due to mounting constraints. It often takes a longer time to put them to use too. The design deficiencies of both these two types of existing portable fire extinguishers render them less effective in fighting fires.

In addition, these existing conventional indoor portable fire extinguishers require human operations. The cylinder-shaped extinguishers need a human to activate and release the extinguishing agents. Without a human to operate them, they are useless in putting out fires.

In addition, these conventional indoor portable fire extinguishers require human operations to activate and release extinguishing agents. Cylinder-shaped traditional fire extinguishers require a human to hold them, activate and aim them at the fire to release the extinguisher agent. They are useless when there are no humans to operate them when a fire starts.

The throwable ball shape extinguisher needs a human to throw it directly into the fire or direct contact with fires to ignite the fuse embedded on its surface to activate the extinguisher. Due to mounting constraints, it is often deployed not immediately adjacent to potential fire sources and often the fire becomes too big and insuppressible when it reaches the throwable ball-shaped extinguisher. For example, throwable ball-shape fire extinguishers are normally deployed on top of a mounting bracket which is placed on the countertop in the kitchen. A fire just starts on the cooking range or the stove will not be able to reach and activate the extinguisher. When the fire reaches the extinguisher, it often already becomes too big and uncontrollable by applying the extinguisher agent. This renders them ineffective to suppress a fire when there are no humans to throw them or when the fire has not reached the throwable extinguisher.

Suffering the aforementioned drawbacks, existing portable fire extinguishers, either the conventional cylinder-shape or the throwable type, are ineffective when there are no humans around to operate them.

U.S. building code requires smoke detectors to be installed in residential houses. However, these smoke detectors surfer serious drawbacks in effectively fighting fires. First, steams, air sprays, dust, and other non-fire-related substances can cause false alarms on smoke detectors. Smoke detectors are also less effective in detecting early fires when the smoke is not strong, causing a delay in fire detection. Smoke detectors are commonly installed in the ceilings which are normally far away from the fire sources such as kitchen stoves or beds. It takes time for the fire-caused smoke to reach the smoke detector. More importantly, even when smoke is detected, smoke detectors can only sound alarms. They cannot suppress fires. It relies on human response to the alarm. There are reported cases when smoke detectors detect fires and sound alarms, but fires still spread beyond control because humans fail to get through locked doors to extinguish fires when they happen.

In summary, current conventional indoor fire safety devices using smoke detectors and portable fire extinguishers suffer significant defects. The present disclosures will significantly improve the effectiveness of firefighting and fire safety to save human lives and avoid property damage.

SUMMARY

This section provides a general summary of the disclosure, and is not a comprehensive disclosure of its full scope or all of its features.

Therefore, the present disclosures have been made in view of the above problems, and it is an object of the present disclosures to provide a smart fire extinguisher device that has an aesthetic, ornamental housing case that has a shape and appearance that fits well in indoor environments in which it is deployed and it can be deployed close to the potential fire sources, such as on a wall close to the kitchen range or stove, without appearing as intruding or an eyesore. Such housing case can look like a painting or mural with different 2-D surface shapes including but not limited to Circle, Triangle, Square, Rectangle, Kite, Star, trapezium, Parallelogram, Rhombus, and different 3-D shapes including but not limited to Cube, Cuboid, Sphere, Cone, and Cylinder, etc. With a measured internal mounting structure, different shapes and sizes of housing cases can be swapped to host the same smart extinguisher device.

It is another object of the smart fire extinguisher device to have a housing case with a mounting mechanism that allows it to be easily mounted to walls and ceilings and to be close to potential fire sources without the need of cutting drywall or retrofitting the existing building structure. For example, the housing case can be mounted to the wall above the kitchen cooking range or to the ceiling right above a location where a heating blanket or other electrical hazard is used.

It is another object of the smart fire extinguisher device that its housing case has one or a plurality of pre-designated sides from which fire extinguishing agents can be released. This allows directional spurt of the fire extinguishing agents inside the device to improve extinguishing accuracy and effectiveness. The pre-designated side for release is used to target the potential fire sources for maximum extinguishing effects. For example, one embodiment, with a rectangular shape housing case mounting on a wall like a mural, is to have only the top surface facing outward using frangible material that can be broken to allow a directional release of extinguishing agents to cover the area right in front of the device. The side mounting on the wall and the other four surrounding surfaces (i.e. the bottom and four sides) use hard materials that will prevent releasing of extinguishing agents. This increases the efficiency of the extinguishing agents to put off fire right in front of the device.

It is another object of the smart fire extinguisher device that it has a detection module or a plurality of detection modules that can automatically detect fires and/or changes in the ambient environment that could lead to potential fires through a variety of sensors, including but not limited to sensors of temperature, infrared, CO, CO2, SO2, smoke, gas, humidity, pressure, motion, proximity, audio/voice, video, and light/photo optic, etc.

It is another object of the smart fire extinguisher device that it is an IoT-enabled (IoT: Internet of Things) device through an onboard communication module which allows it to communicate, through a plurality of wired or wireless communication mechanisms including but not limited to hard wires, Wi-Fi, Bluetooth, wireless cellphone signals, and other proprietary communication mechanisms, in a peer-to-peer mode and/or through an electronic communications network (such as intranet, internet, local network a.k.a. LAN, wide area network a.k.a. WAN, cellular etc.) to a plurality of hardware/firmware/devices/apparatus and/or software/applications, whereas the hardware/devices/apparatus may include computers, servers, tablets, mobile phones, consumer electronic wearables (such as smart watches, smart eye-glasses, smart wrists, etc.), and other devices; and the software/applications running may include firmware applications, mobile software, desktop/laptop/PC software, server software, database, data collection software, data processing and analysis software, pattern recognition software, knowledge database, decision models, and other AI (artificial intelligence) software, etc.

It is another object of the smart fire extinguisher device that it has a control module that can receive inputs from the detection modules of all sensor values; record received sensor values and relevant time as time serial values; apply algorithms, logics, and/or AI models for data analysis, pattern recognition, and decisions; conduct self-diagnose of all onboard modules and generate reports, transmit all collected data and reports to servers and/or other network devices through the communication module; and receive commands from servers and/or other network devices.

It is another object of the smart fire extinguisher device that it has an encryption module that works with the communication module to encrypt the communications between the device and other hardware or software. This encryption module can be a hardware, firmware, software, or a combination of these. It provides security to prevent unauthorized access to operate and/or activate the smart fire extinguishing device. Such an encryption module uses a plurality of encryption techniques including but not limited to hash algorithms, blockchain algorithms, public/private keys, multifactor authentications, and other security mechanisms. It also uses hardware and/or software acceleration algorithms to improve communication speed.

It is another object of the smart fire extinguisher device that it has an extinguisher module that is connected to the control module and can be electronically set off by the control module to spontaneously release fire extinguishing agents.

It is another object of the smart fire extinguisher device that it has at least one fuse connected to the surface of the device and the extinguisher module inside. The fuse can be ignited by fire and set off the extinguisher to spontaneously release extinguishing agents.

It is another object of the smart fire extinguisher device that has an alarm module that can sound fire alarms on the device. This alarm annunciator can be activated by the control module when an abnormally high temperature or a fire is detected, or when a button (or a trigger, a switch, etc.) on the device is manually pressed.

It is another object of the smart fire extinguisher device that has a speaker on it to sound an alarm through onboard speakers when a fire warning or an actual fire is detected.

It is another object of the smart fire extinguisher device that it can communicate, through the network to which it is linked and/or directly point-to-point connections, to other devices in the same indoor proximity (such as other rooms inside a house and/or the same building), or remotely, to sound alarms when the alarm on the first fire extinguishing device is activated. All alarm devices can subscribe to the same fire alarm broadcast channel and/or an event notification queue to get fire alarms when any other devices connected to the network send out a fire alarm notification through the broadcast channel or queue.

It is yet another object that this smart fire extinguisher device can work autonomously and independently by itself to detect fires, sound alarms, transmit out alerts, and automatically activate its onboard extinguisher to extinguish fires, without depending on humans or other devices and inputs through networks.

It is another object of the smart fire extinguisher device that it has a physical button that, once pressed, will activate the extinguisher to spontaneously release extinguishing agents. After the button is pressed, there will be a configurable safety period, such as 3 to 5 seconds, to allow a human to cancel activation by pressing the button again or use the time to move away from the device or throw the device into a fire.

It is another object of the smart fire extinguisher device that it has and can use an onboard voice/audio sensor, motion sensor and proximity sensor to detect if there are humans in its proximity.

It is another object of the smart fire extinguisher device that it can put itself in dormant hibernation mode to save battery and it has a timer onboard that can wake up and re-activate the device on a schedule that can be dynamically set. The device has the algorithm and intelligence either through the control module or inputs from network servers or smart devices (such as a mobile application interfacing with a human), to choose wake-up and data collection schedules based on whether human activities are detected. When human activities are detected, the device can set longer wake-up intervals to save battery power.

It is another object of the smart fire extinguisher device that the modules in the device can be easily bundled, swapped, and plug-and-play. For example, when the extinguisher module in a device is activated, it can be replaced with another extinguisher module without replacing other modules in the device (i.e. control module, communication module, etc.). Another example is when a control module fails, it can be easily replaced with another control module without replacing other modules in the device. Yet in another example, a second extinguisher module can be added to the device to increase the extinguishing area the device can cover. Yet in another example, a second control and a second communication module can be added to the device to work as fault-tolerance backup so as to increase the effectiveness of the device.

It is another object of the smart fire extinguisher device that it can have different configurations. For example, a standard model will have a detection module, a control module, a communication module, an extinguisher module, and an alarm module. This base unit can perform automatic detection, alert, and extinguishment. A second configuration can be a detector model which has a control module, an alarm module, and a communication module. It can detect and alert, but cannot extinguish fires. A third configuration is an extinguisher model which has a communication module, a control module, and an extinguisher module. It can simply receive commands to set off the extinguisher to put out fires. A fourth configuration is an alarm model that has a communication module and an alarm module. It can sound alarms when receiving a fire alert. These different configurations allow customers to enhance desired functions whether it is to put more detection units to cover more areas, put more extinguishers to enhance extinguishing effects, or put alarms in rooms not close to fire sources).

It is another object of the smart fire extinguisher device that when a detection unit detects fires, it can communicate with all other types of units in the local indoor proximity or connected through networks to sound alarms.

It is another object of the smart fire extinguisher device that all configuration types of devices can be powered either by batteries onboard the device or outside power outlets.

It is another object of the smart fire extinguisher device that an extinguisher unit can be mounted on a mobile platform, such as a drone or a moveable robotic platform, to deliver an extinguisher unit to put out fires detected by a detection unit.

It is another object of a smart fire extinguishing system that it has a plurality of same smart fire extinguishing devices and a plurality of alarm devices within the indoor proximity of the same smart fire extinguishing devices to sound alarms in every desired location.

It is another object of the smart fire extinguishing system that the same smart fire extinguisher device can communicate with the network or cloud-based servers, computing devices, and software applications, which can process the data and information from the smart fire extinguishing device, apply various processing, business, and AI models, and transmit information and commands back to the smart fire extinguisher device or other devices (such as other servers, electronic equipment at fire stations, consumer electronic equipment, PCs, mobile phones, tablets, wearables, etc.), through wired or wireless networks and/or direct point-to-point communication channels.

It is another object of the smart fire extinguisher device that it sends fire alert information directly or through networks, servers, or cloud-based computing services to consumer electronic equipment (such as PCs, mobile phones, tablets, wearables, etc.) to alert owners of the device, who are remote from the device, about fire and ambient conditions detected by the device so that owners can respond through electronic equipment such as PCs or mobile applications by choosing one or more responses: 1) to set off the fire extinguisher model on the device; 2) report the fire to fire stations for rescue; 3) recognize the alert as a false alarm and not set off the extinguisher module; 4) confirm the alert and choose not to set off the extinguisher (for example, owners can call someone at the scene to handle the situation).

It is another object of the smart fire extinguisher device that upon receiving an alert sent from the device, the owner of the device can remotely turn on a video camera on the device to watch the ambient environment of the device, and assess and verify the reported fire situation.

It is another object of the smart fire extinguisher device that can communicate with other alarm devices in the same house or the proximity of the device, directly or through other communication mechanisms such as home Wi-Fi or Bluetooth, to sound an alarm when an abnormal condition (such as a high temperature) or a fire is detected.

It is another object of the smart fire extinguisher device that its detection module can collect data from all onboard sensors in real-time or on a schedule dynamically adjusted based on historical collected data patterns. For example, the device can start by collecting temperature data in real-time every second. If the temperature remains constant for three seconds, the device can change to sample and collect data every 10 seconds, 15 seconds, or longer. If sensor values remain unchanged or within a tolerance of errors, the device can set a timer to go dormant and wake up in a configurable or dynamically changeable time period to resume sampling and collecting data. This will save the onboard battery.

It is another object of the smart fire extinguisher device that the device and its connected cloud-based SaaS platform monitoring service and mobile apps are all capable of having logic to decide whether the extinguisher should be activated to spurt extinguishing agents. The device uses its onboard control module to determine whether a fire happens and to activate the extinguisher. An owner of the device can send an activation command through the mobile device to activate the extinguisher. The cloud-based service platform using AI models in determining whether a fire is happening or about to happen will warn the device owner in real time of discovering a fire and send a command to activate the extinguisher remotely when the device owner fails to respond. These three levels of decision-making provides extra safety and fault tolerance in case any one or two levels fail to activate the extinguisher when a fire happens.

It is an object of the smart fire extinguisher devices and the cloud-based SaaS service platform connecting said devices that the cloud-based service has multiple servers. The servers and SaaS service can manage the registration of devices and device owners (i.e. users), data collection, data archive, data analysis, and making decisions to alert customers and/or activate the extinguisher device. The service platform runs a plurality of data analysis models and artificial intelligence (AI) models to detect and identify abnormal conditions that indicate or predict fires. Data collected can include sensor types, sensor configuration values, sensor time series values, onboard battery levels, device locations, nicknames, owner information, device historical data, and other related data useful for serving customers.

It is an object of the smart fire extinguisher device and its connected cloud-based SaaS service platform that the service can identify the location of the device detecting a fire and notify the closet fire station when the device owner subscribes to 911 fire station alert service.

It is an object of the smart fire extinguisher device and its connected cloud-based SaaS service platform that the service platform can identify the location of each device and its "neighboring" devices that are in proximity and may be affected by fires detected by the same device so that when the device detects a fire, the cloud service can notify all owners of the neighboring devices about a fire happening in the proximity of the neighborhood. This is especially useful for neighbors living in the same apartment building or townhouses where a fire in one unit can quickly spread to the neighboring apartment units or townhouses. The SaaS will provide each device owner an option to subscribe or opt out of such neighborhood warning service.

It is an object of the smart fire extinguishing device, its connected cloud-based SaaS service platform, and the device owner's monitoring devices that the owner can set preferred fire warning temperature and extinguisher discharge temperature; the SaaS service can recommend and set default values of fire warning and extinguisher discharge temperature, taking into consideration of industry standards and recommendations, historical data collected from the device, geographic and seasonal climatic conditions of the device, and user preference.

It is an object of the smart fire extinguisher device that has a sound detector that detects the high pitch alarm sound of conventional smoke detectors and upon detection of smoke detector alarm sounds it can send alerts to other devices locally or to remote servers and consumer devices.

It is another object of a smart fire extinguishing system that it has a plurality of smart fire extinguishing devices, a plurality of cloud-based computing servers connected through networks, and devices within the indoor proximity of the same smart fire extinguishing device to sound alarms in every desired location.

Various objects, features, aspects, and advantages of the present disclosure will become more apparent from the following detailed description of preferred embodiments of the disclosure, along with the accompanying drawings in which like numerals represent like components throughout.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
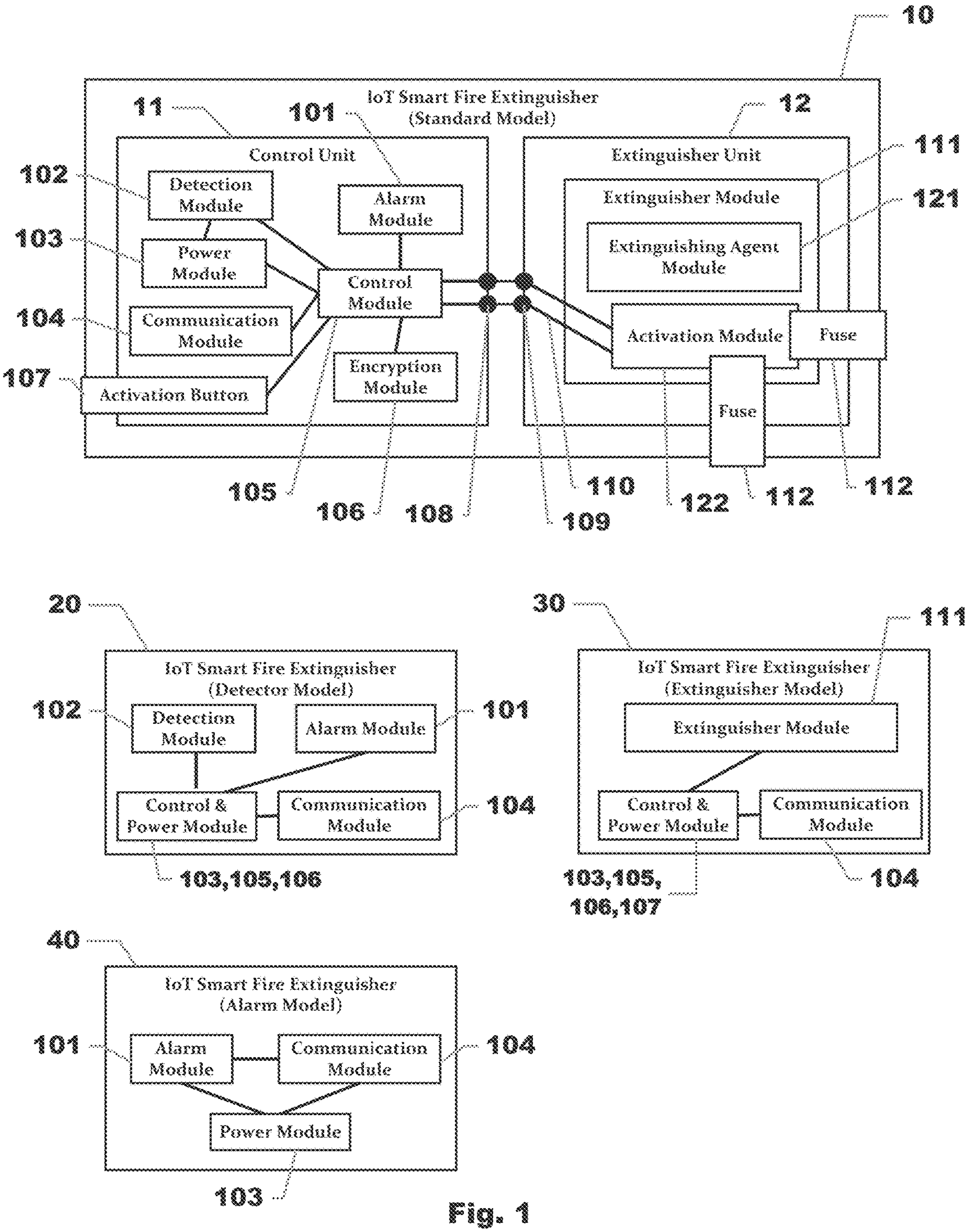
FIG. 1 is a schematic structural view of the Smart Fire Extinguisher device with four different embodiments.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

AI though the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure relates to automatic fire detection, alert, and suppression. In particular, the disclosure describes, among other things, embodiments of a smart fire extinguisher device, a smart fire extinguishing system, a cloud-based SaaS service platform, and related methods of applying a variety of models (such as data processing, pattern recognition, prediction, and artificial intelligence, etc.) to conduct smart and automatic fire detection, fire alerts, and fire suppression using the smart fire extinguisher devices, the smart fire extinguishing system, and the service platform.

It will be readily understood that the components of the present disclosure, as generally described and illustrated in the drawings herein, could be arranged and designed in a wide variety of different configurations, and thus is not limited to the embodiments described herein. Thus, the following more detailed description of the embodiments of the smart fire extinguisher device, the smart fire extinguishing system, the cloud-based SaaS service platform, and related methods related to the present disclosure for smart and automatic fire detection, fire alerts, and fire suppression as represented in the drawings, is not intended to limit the scope of the disclosure, but is merely representative of various embodiments of the disclosure. In addition, in order to clearly explain the present disclosure in the drawings, parts unrelated to the description are omitted, and similar reference numerals are attached to similar parts throughout the specification. The illustrated embodiments of the disclosure will be best understood by reference to the drawings, wherein like parts are designated by like numerals throughout.

Referring to FIG. 1, the smart fire extinguisher device has at least four models: a Standard Model (10), a Detector Model (20), an Extinguisher Model (30), and an AI arm Model (40). The Standard Model has the full functionality of detecting fires, communicating with other local devices and the network or remote SaaS service platform, and extinguishing fires. The Detector Model (20) has a detection module 102, a control module 103, an alarm module 101, and a communication module 104. It is capable of detecting fires and sending out alerts to other local devices and the network or remote SaaS service platform. It does not have an extinguisher unit and cannot extinguish fires. It is used to help to expand detection area and accuracy at a lower cost.

The Extinguisher Model (30) has a communication module 104, a control module 103, and an extinguisher module 111. It does not have detection functionalities. It can simply receive commands to set off the extinguisher to put out fires. It is used to enhance extinguisher power and coverage when a fire is detected by other devices or when an activation command is received.

The AI arm Model (40) has an alarm module 101 and a communication module 104. It can only sound alarms upon receiving a fire alert. It is used to expand the area where alarms can be heard. These different configurations allow customers to enhance desired functions whether it is to put more detection units to cover more areas, put more extinguishers to enhance extinguishing effects, or put alarms in rooms not close to fire sources).

For example, when a fire is detected by a device in the kitchen, an alarm model device in a bedroom on a separate floor or in other neighboring units (such as neighboring houses or apartment units in a whole building) can be activated to sound alarms. This enhances the coverage and effectiveness of sounding alarms at a low cost.

Figure 13:
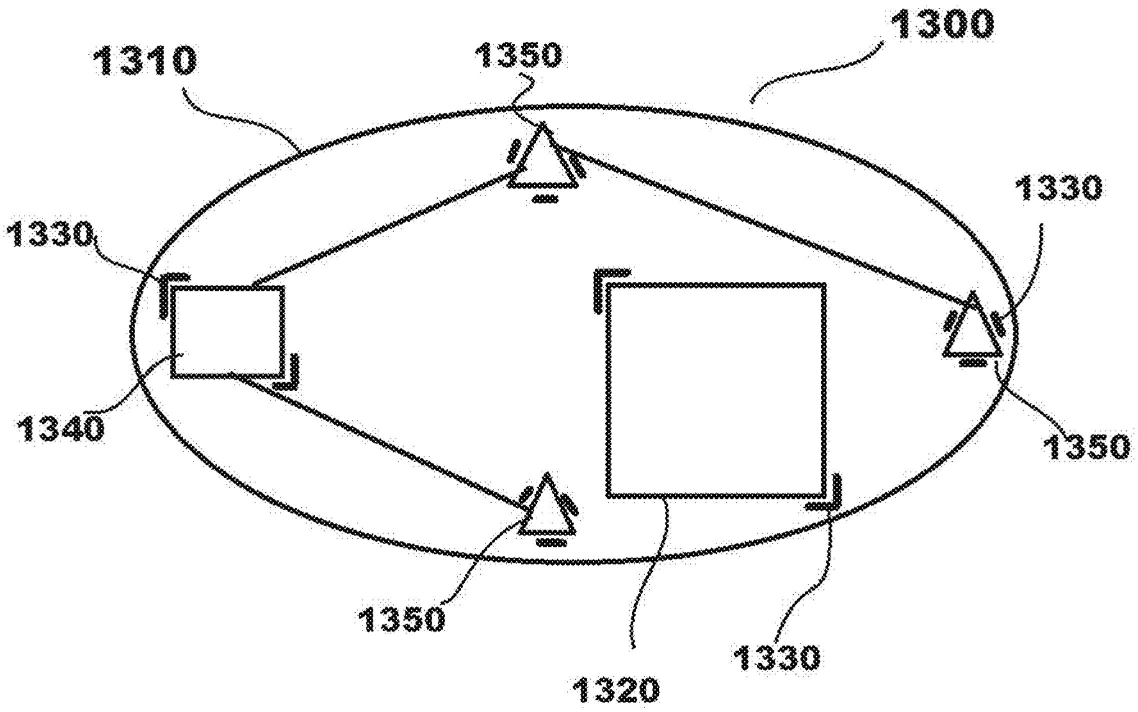
FIG. 13 shows an embodiment of the device with an oval shape outer housing case (1310) that has molded holding and securing structures (1330) inside to hold multiple devices of different models.

Referring to FIG. 1 and FIG. 13, a fire extinguisher device 1300 includes an outer housing case (1310) and different device models with different device cases (1320, 1340, and 1350 in FIG. 13, related to 10, 20, 30, and 40 in FIG. 1) can be mounted in the housing case (1310) using pre-molded holding structures (1330). The capability of adding multiple devices, such as two extinguisher modules or three detection modules and the flexibility of positioning the devices at desired locations help achieve the best effects of detection and extinguishment.

Figure 10A:
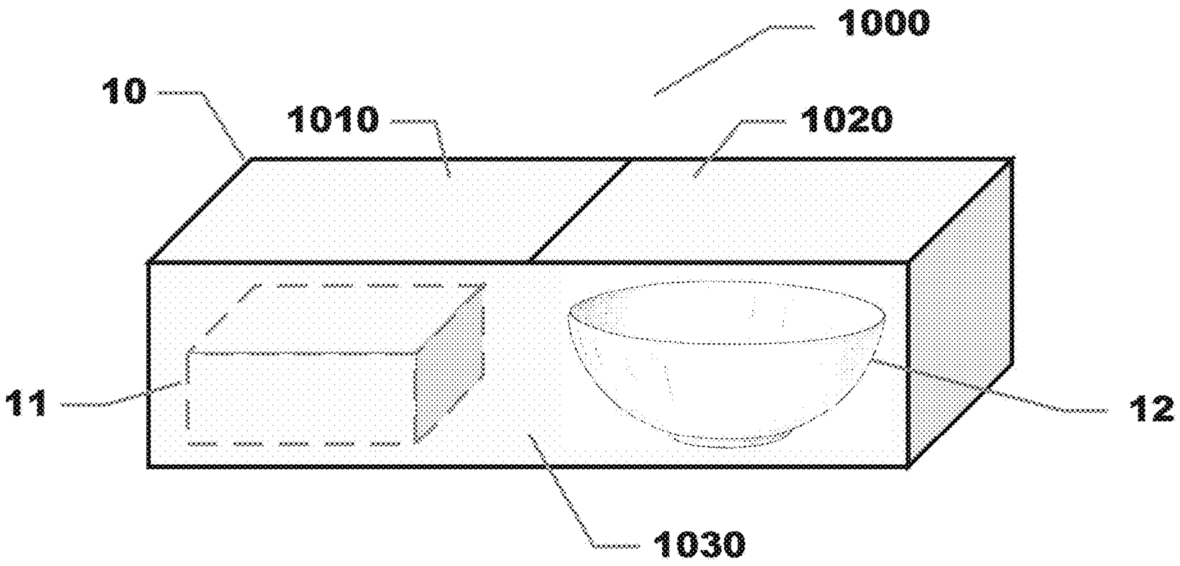
FIGS. 10*a* and 10*b* show a prototype of one possible embodiment of the Smart Fire Extinguisher device (1100) and its internal structure (1001)
Figure 10B:
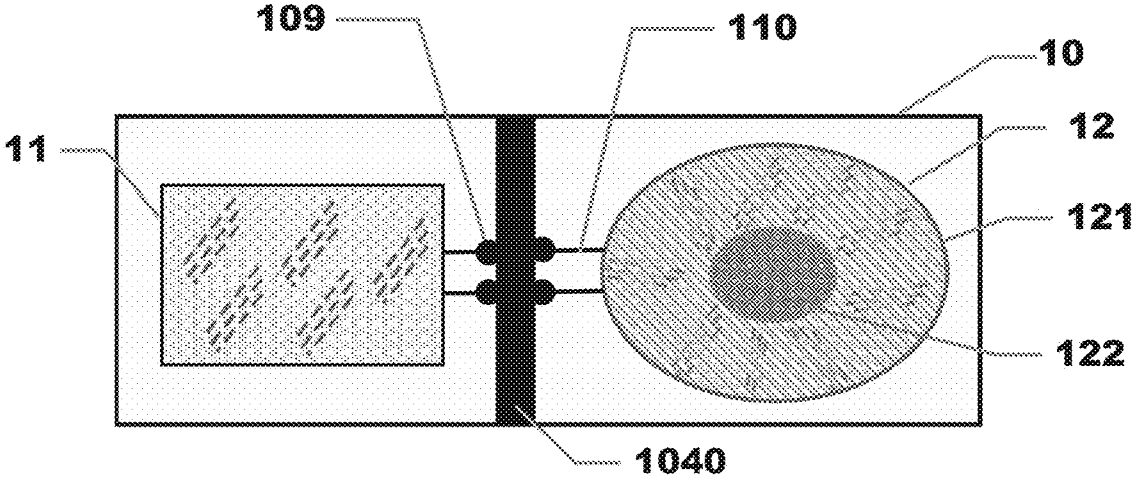

With reference to FIGS. 10*a*, and 10*b*, in an exemplary embodiment, a Standard Model (10) of the smart fire extinguisher device can have a plurality of modules inside it, including at least one Control Unit (11) and one Extinguisher Unit (12). The Control and the Extinguisher Unit are housed in separate compartments inside the device and are connected through the Plug-and-Play connectors (108 and 109), each residing on the Control Unit 11 and the Extinguisher Unit 12, respectively. Each unit can be plug-and-played, that is they can be independently swapped and replaced without affecting the other unit. For example, when the control unit 11 fails, it can be replaced without replacing the extinguisher unit 12 and vice versus. After an extinguisher module (111) is activated, only the extinguisher unit 12 needs to be replaced and the control unit 11 does not need to be replaced.

In an exemplary embodiment, the Control Unit 11 can have, at least, one AI arm Module (101), one Detection Module (102), one Power Module (103), one Communication Module (104), one Control Module (105), one Encryption Module (106), one manual activation mechanism (107) such as a button or switch, and a Plug-and-Play connector (108) connecting to the Extinguisher Unit (12).

In an exemplary embodiment, the Extinguisher Unit 12 can have, at least, one Extinguisher Module (111), one Extinguishing Agent Module (121), one Activation Module (122), a Plug-and-Play connector (109) and electric wires (110) connecting the Activation Module with the connector (108), and a plurality of fuses (112) connecting the Extinguishing Agent Module (121) to the surfaces of the device (10).

In an exemplary embodiment, the AI arm Module (101) has speakers on it to sound alarms when it receives a command to sound alarms. This can happen when a Control Module 11 detects abnormally high temperatures or conditions and determines to sound alarms as in the Standard Model 10 or when the AI arm Module 101 receives an external command through the communication module 104 on an AI arm Model device 40. In one embodiment, when a first device determines to sound alarms or activate the extinguisher module 111, it can broadcast the fire emergency decision to other devices in the same local proximity that may be impacted by the fire. Upon receiving such fire emergency information, all locally impacted devices, subscribed to the same firefighting system and/or service platform, can activate their respective alarm modules. This helps expand the alarm warning area. For example, when a fire happens in a kitchen, another device in a room on a different floor, where the alarm sound from the first device in the kitchen cannot be heard, can sound alarms upon receiving the fire emergency broadcast from the first device to warn people. In a second example, when a fire happens in one unit in an apartment building, the device in this unit can inform other devices in the same building about a fire emergency or devices in a remote monitoring location. The other devices, remote from the fire scene, can start sounding alarms and the location of the first device broadcasting the fire emergency can be displayed on mobile applications related to other devices in the same building. This way, people in other units inside the same apartment building or in a remote monitoring location can be alerted about the fire emergency and respond to the fire not happening in their immediate units but may impact them soon. The communication from the first device to other devices can be through the network or directly point-to-point connections. All alarm devices can subscribe to the same fire alarm broadcast channel and/or an event notification queue to get fire alarms when any device sends out a fire alarm to the channel or the queue.

In an exemplary embodiment, the Detection Module (102), can have a plurality of sensors of a plurality of types of sensors, including but not limited to sensors to detect temperature, infrared, CO, CO2, SO2, smoke, gas, moisture and humidity, pressure, color, light, motion, proximity, sound/audio/voice, image and photoelectric, particulate matter, and light/photo optic, video camera, etc. Through these sensors, the Detection Module 102 can detect actual fires and changes in the ambient environment that could lead to potential fires. The Detection Module 102 is connected to and controlled by the Control Module 105 and feeds all detected sensor values to the Control Module 105. The detection module 102 can use an onboard motion and proximity sensor, or a sound/voice/audio sensor to detect if there are any humans in its proximity. In addition, the Detection Module can detect high pitch alarm sounds generated by common conventional home smoke detectors, and upon detection of smoker detector alarm sounds it can send alerts to other devices locally and/or to remote servers and consumer devices. This enables a smart fire extinguisher device 10 to send out fire alerts when any smoke detectors in its proximity sound alarms.

In an exemplary embodiment, the Power Module (103) provides power to the device. The power can come either from a battery or a power line connected to an external outlet. Battery level and capacity can be detected by the Detection Module 102.

In an exemplary embodiment, the Communication Module (104) can communicate with other local devices and remote servers and apparatus through either wired or wireless communication mechanisms including but not limited to hard wires, Wi-Fi, Bluetooth, wireless cellphone signals, and other proprietary communication mechanisms. The communication can be either peer-to-peer direct communication or through an electronic communications network (such as an intranet, an internet, a local network a.k.a. LAN, a wide area network a.k.a. WAN, or a cellular network, etc.). The other local devices and remote servers and apparatus may include a plurality of hardware (including firmware, desktops, laptops, PCs, mobile phones, other devices, apparatus, and wearables-such as smart watches, smart eyeglasses, smart wrists, etc.), which run a variety of computing software (including algorithms, applications, servers, cloud servers, virtual server software, mobile applications, database, data collection software, data processing and analysis software, pattern recognition software, knowledge database software, decision model software, AI (artificial intelligence) software, and other computing hardware and software.

In an exemplary embodiment, the Control Module (105) can receive inputs from detection modules 102 of all sensor values. It can record received sensor values and relevant time as time serial values. It can conduct a self-diagnose of all modules onboard the device and generate reports. Through the communication module 104, it can transmit collected information (including data, reports, status, alerts, alarm, and other information) to and receive information (such as firmware updates, software and model updates, configuration values, threshold values, activation commands, etc.) from other local devices and remote servers and apparatus. It can apply the foregoing mentioned computing software to conduct data analysis, pattern recognition, and decision-making. Based on collected sensor values and other inputs, the Control Module's 105 software has algorithm, logics, and/or AI models to independently determine whether to activate the Extinguisher Module 111 to spurt extinguishing agents to put out fires without relying on any outside inputs or commands. This allows the device to act autonomously to put out fires without relying on any human or other outside inputs.

In an exemplary embodiment, the Encryption Module (106) provides this IoT device security at the source. It encrypts the communications between the device and other external hardware or software. This encryption module 106 can be hardware, firmware, software, or a combination of these. It provides security to prevent unauthorized access to the device-such as accessing sensors and sensor data, or maliciously activating the extinguisher module 111. Such an encryption module 106 can use a plurality of encryption techniques including but not limited to hash algorithms, blockchain algorithms, public/private keys, multifactor authentications, and other security mechanisms. It can use hardware and/or software acceleration algorithms to improve communication speed. This Encryption Module 106 can be combined into the Communication Module 104 or the Control Module 105.

In another exemplary embodiment, the smart fire extinguisher device 10 has an Activation Mechanism (such as a button, a switch, a trigger, etc.) (107) on it. When a user manually activates this Activation Mechanism 107 (such as a button or a switch), the device will start a countdown of a configurable safety time period, such as 3 or 5 seconds, and then activate the extinguisher module 111 to spurt extinguishing agents. If the user presses the button 107 again during the safety time period, it will abort the activation. A user can use said safety time period to move away from the device 10, or throw the device 10 into a fire, or abort activation by pressing the button 107 again. When the Activation Mechanism 107 is activated, the device can sound alarms to warn the user about the activation status.

In another exemplary embodiment, the modules in the device can be easily bundled, swapped, and plug-and-play. For example, when the extinguisher module 111 has been activated, it can be replaced with another extinguisher module without replacing other modules in the device 10 (i.e. control module, communication module, etc.). Another example is when a control module 105 fails, it can be easily replaced with another control module 105 without replacing other modules in the device. Yet in another example, a second extinguisher 111 module can be added to the device to increase the extinguishing area the device can cover. Yet in another example, a second control 105 and a second communication module 104 can be added to the device to work as fault-tolerance backup so as to increase the effectiveness of the device. Yet in another example, a second detection module 102 and a second battery module or power module 103 can be added to the device to increase the effectiveness and accuracy of sensor detection. Yet in another example, a second battery module can be added to the device to increase battery life and serve as a fault-tolerance backup power source.

In another exemplary embodiment, the Extinguisher Module (111) is connected to the control module 105 and can be electronically set off by the control module 105 to spontaneously release fire extinguishing agents. It has an Extinguishing Agent Module (121) which stores extinguishing chemical agents (such as mono ammonium phosphate, potassium bicarbonate, or sodium bicarbonate powders), and an Activation Module (122) which, upon receiving a command or electric charge from the control unit, will trigger the release mechanism to spontaneously discharge the extinguishing chemical agents. The Activation Module 122 can also be set off by fuses (112) that connect to the surfaces of the device when the fuses are ignited by fires. This provides a dual mode of activation allowing the extinguisher to be set off either by electronic signal/command or by lighting up the fuses. When the device is thrown into a fire or when a fire reaches the device, the fuse 112 will be ignited to activate the extinguisher module 111. This guarantees when there is a failure on the Control Unit, the Extinguisher Module 111 itself can still be activated when the fuses 112 are ignited by fires. Thus the extinguisher can be set off to extinguish fires when the device is thrown into a fire or the fuses 112 are ignited by fires.

Referring to FIG. 1, in another exemplary embodiment of the present disclosure, some modules can be combined to form new modules with modular functionalities. For example, in one embodiment, as shown in the Detector Model (20), the functionalities of control, power, and encryption can be combined to form a simplified module to simplify the design and low costs. Another example is the module combining functions of modules 103, 105, 106, and 107 for the same purpose.

Figure 2:
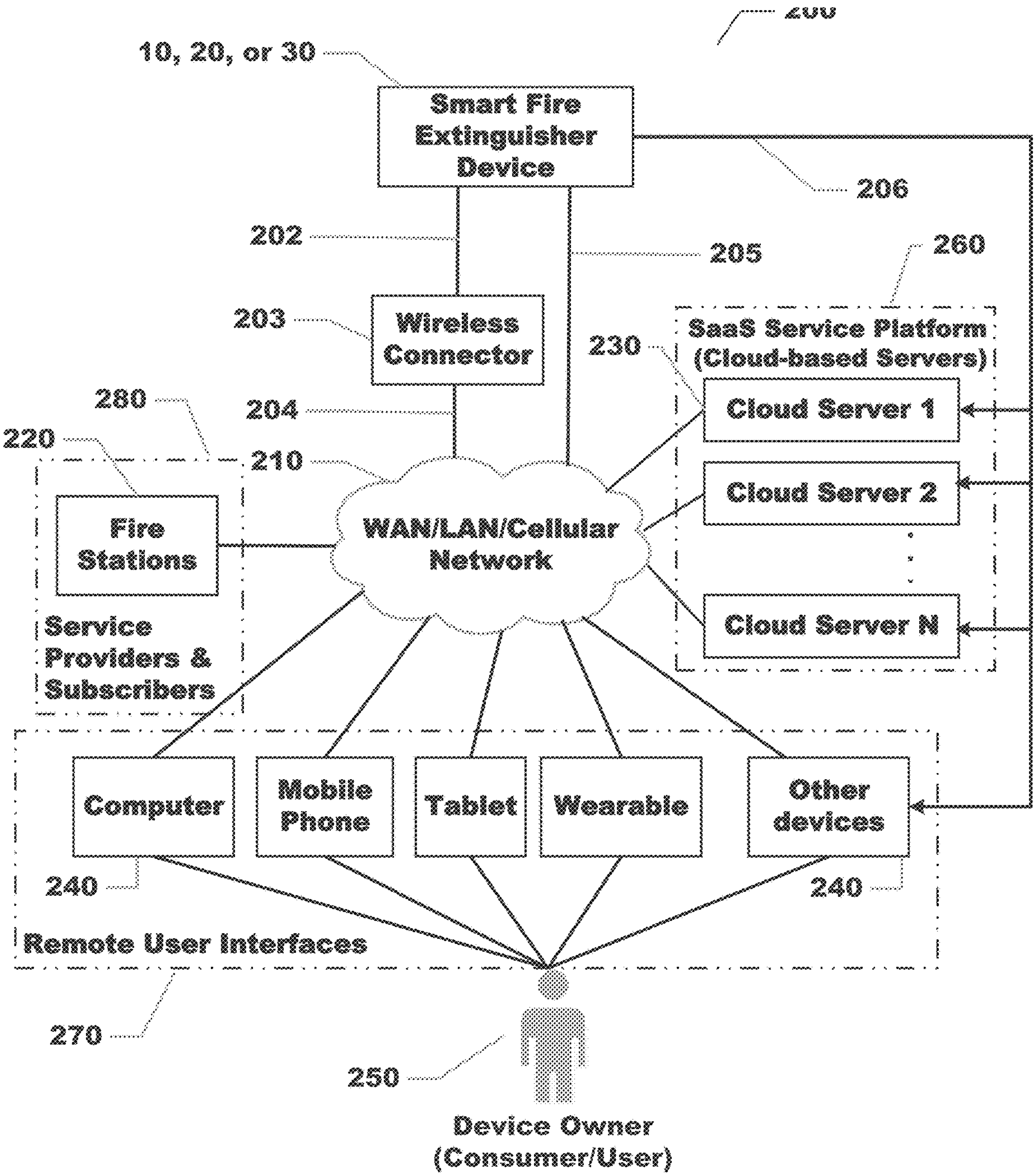
FIG. 2 is a schematic diagram of how the Smart Fire Extinguisher device is connected to the SaaS Service Platform, and remote user interface devices, according to the principles of the present disclosure.

Referring to FIG. 2, according to one embodiment of the present disclosure, a cloud-based SaaS service platform (260) connects a smart device with cloud servers and end-user monitoring devices to collect and analyze device sensor data, apply data analytic and/or AI models to analyze device ambiance environment, and recognize patterns of fire hazards, for fast, intelligent, and automatic fire detection, alert, suppression, as well as alert public fire-response and firefighting 220. A smart fire extinguisher device (such as model 10, 20, 30) can communicate with the SaaS service platform (260) consisting of a plurality of cloud servers (230), other third-party service providers, and service subscribers (280) (such as fire stations 220, fire departments, home security monitoring companies, insurance companies, etc.), remote user/consumer devices, and remote user interface devices 270. The communication can be a wireless connection (202) (including WiFi, Bluetooth, etc.) through a wireless connector (203) (such as routers, cellular gateways) over network infrastructures (204) such as (phone lines, cables, fiber optical lines, satellite links, etc.). The devices can also be connected through peer-to-peer connections (205) such as wired connections. The connection can go through at least one network (210) (such as a WAN, a LAN, or a cellular network, etc.). The connection can also be a direct peer-to-peer connection (206) to remote servers (240) with specific IP addresses. The SaaS Service Platform (260) consists of a plurality of cloud-based servers (230) that can be any computing servers, software, AI models, database, data storage, etc. Through the network, device owners and other end users or consumers (250) can interact through the Remote User Interfaces (240) (software, firmware, PC applications, mobile applications, etc.) running on a variety of end-user monitoring and interface devices/equipment (270) (such as PCs, mobile phones, tablets, wearables, and other devices allowing end-users to monitor and interact) to communicate and interact with the device to display device status, change device fire alert thresholds, and other configuration values, activate the extinguisher module 111 on the device, and perform other interactions with the cloud servers 230 and the device 10, 20, 30.

In one exemplary embodiment, the smart fire extinguisher device collects sensor values using its detection module. It then applies logics and models onboard its control module 105 to determine whether a fire hazard arises. If it determines that the detected condition exceeds configured fire emergency thresholds indicating a fire emergency arises, it can immediately activate the extinguisher module 111 by sending an electric charge to ignite the activation module 122 inside the extinguisher module (111). This will immediately set off the extinguisher module 111 to spontaneously release the extinguishing agents to put out fires. The device can do this automatically and independently without any outside inputs or human intervention. If the control module 105 determines that all statuses are normal or only the alert threshold is exceeded, it will send device status values and collected sensor values to the service platform (260). The service platform 260 upon receiving information from the device 10 will conduct its own analysis by applying a variety of processing models such as data analysis models, pattern recognition models, prediction models, AI models, decision models, and other processing logics. It then sends a group of pre-selected device statuses and processing results and recommendations to the remote user interface and equipment (240 and 270) for the device owners 250 to monitor and respond. The device owner 250 can perform a range of actions through the remote interface 270. For example, the device status and alerts can be displayed on a mobile app running on a user's mobile phone or on a PC running monitoring software at a fire station 220 or home security company. The device owner 250 or other end users can then view any status and alerts from the device and respond with their inputs. For example, the device owner 250 can monitor the ambient temperature, alert threshold values, and battery level reported by the device. The device owner 250 can also choose to activate the extinguisher module 111 on the device 10 by tapping an activation button on the mobile app. The mobile app will then send the inputs from the device owner to the service platform 260 which relays the inputs to the corresponding device 10. This accomplishes a round-trip interaction between the device 10 and the device owner 250 who can remotely control and interact with the device 10. Similarly, it also allows other parties (such fire stations 220) to interact with remote end users and/or remote devices, as pre-agreed upon by the device owner 250. By connecting the device owner with the device through the service platform 260, the device owner 250 can remotely interact and control the device 10 to get the device ambient status, receive fire alerts, and actively set off the extinguisher module 111.

In the aforementioned embodiment, the decision to activate and set off the extinguisher module 111 can be made at multiple levels and the smart extinguisher device 10 can be set off in multiple ways. The smart device 10, the SaaS service platform 260, and the device owner 250 through the remote user interface 270 (such as a mobile app) are all capable of having logics, algorithms, and decision models to decide whether the extinguisher module 111 should be activated to spontaneously release extinguishing agents. The smart device 10 can use its onboard control module 105 and its onboard software to independently and autonomously determine whether a fire happens and to activate the extinguisher module 111 accordingly without any outside human or electronic inputs. The device owner 250 can press an activation button on the mobile app in response to a fire alert or at any time as the device owner's choice to remotely set off the extinguisher module 111. Upon receiving the device owner's inputs, the mobile app can send the activation command through the service platform 260 to the smart device and activate the extinguisher module 111. The service platform 260 can use its algorithms and decision models to determine whether a fire arises and whether it is necessary to preempt to command the device 10 to activate the extinguisher module 111. The service platform 260 will alert the device owner 250 about fire emergencies. When the device owner 250 fails to respond or when the decision models at the service platform 260 determine a fire situation is getting worse and a response is needed, the models at the service platform 260 can step in and may even override the device owner's decision to send a command to the device 10 to activate the extinguisher module 111. The three level decision-making provides extra safety and fault tolerance in case any one or two levels fail to respond to activate the extinguisher module 111 when a fire happens. The smart extinguisher device 10 can also be set off by pressing a physical button 107 on the device 10 or by igniting the fuses 112 embedded on the surface of the device 10 and connected to the Activation Module 122. The button 107 on the smart device 10 allows a human to activate the extinguisher module 111 directly without using a mobile phone or other electronic devices. When a fire reaches the device 10 or when the device 10 is thrown into a fire, the fuse 112 connecting the surface of the device 10 will be ignited. It will then activate the extinguisher to spontaneously release extinguishing agents. This capability of independent decision-making at multiple levels (i.e. the smart device itself, the service platform, and the device owner) and in multiple ways (i.e. activation by electronic signals, activation by pressing a physical button, or activation by direct contact with fire) allows the smart device to meet more use case scenarios than traditional portable fire extinguishers.

In another exemplary embodiment, the communication between the smart fire extinguisher device 10 and the service platform (260), and the communication between the service platform 260 and the remote device owners (250) through the remote user interfaces 270 can be in two different modes: a real-time synchronous fashion or a non-real-time asynchronous mode.

For critical missions (such as setting off the extinguisher module 111 when a fire emergency arises), the communication will be elevated in real-time synchronous mode. For example, upon receiving a mission-critical fire alert from the device 10, the service platform 260, before doing any other processing, will first immediately send the fire alert in real-time mode to the remote user interfaces (240) and wait for the device owner 250 to respond in synchronous mode. For example, when a device 10 detects a fire, the service platform 260 immediately sends a notification to the device owner's mobile phone 240 causing it to vibrate and/or sound a unique loud alarm, and then wait for the device owner 250 to respond. When the device owner 250 responds on the mobile app to activate the extinguisher module 111, the mobile app will immediately send this activation command to the service platform 260 which will immediately relay the activation command to the corresponding device to set off the extinguisher module 111.

For non-critical missions (such as displaying device status), the communication can be set in a non-real-time asynchronous mode. For example, when the device reports no fire emergency alerts and all statuses are normal, the service platform 260, after receiving the information from the device, can conduct all kinds of analysis and processing without sending the status to the device owner's mobile phone 240. Device status will be sent to the device owner's user interface 240 only when the owner pulls or inquiries about the device status. When the device owner 250 starts a critical mission such as pressing the activate button on a mobile app, the communication can be elevated to real-time mode. The non-real-time asynchronous mode reduces unnecessary interference to the device owner 250. It also reduces unnecessary communication traffics while saving system resources and improving the performance of the whole system without affecting the effectiveness of fire detection and suppression.

In another exemplary embodiment, the smart fire extinguisher device 10 collects sensor values and communicates with the service platform (260) and/or the remote user equipment (240 and 270) via direct peer-to-peer connections (206).

In another exemplary embodiment, the smart fire extinguisher device collects sensor values and communicates with the service platform (260) via wireless connections through wireless connectors (203) (such as routers and cellular gateways) over communication infrastructure (204) such as (phone lines, cables, fiber optical lines, satellite links, etc.) to at least one network (210) (such as a WAN, a LAN, or a cellular network, etc.). Over the network, the service platform (260) connects with other service providers and subscribers (280) and remote user interfaces and equipment (270).

In another exemplary embodiment, the smart fire extinguisher device 10 collects sensor values and determines whether a fire hazard arises. When a fire hazard emerges, it sends fire alert information directly or through networks to servers, cloud-based computing services, and remote user interfaces (240) to alert device owners (250).

In another exemplary embodiment, the smart fire extinguisher device 10 uses sensors in its detection module 102 to collect data in real-time or on a schedule dynamically adjusted based on historical data patterns. For example, the device 10 can start by collecting temperature data in real-time every second. If the temperature remains constant for a three seconds period, the device can change to data sampling and collecting cycle to every 10 seconds, 15 seconds, or longer. If sensor values remain unchanged, within a configurable tolerance of errors, the device can set a timer to go dormant and wake up in a dynamically configurable time period. This helps save the onboard battery power and extend battery life without sacrificing fire detection effectiveness.

In another exemplary embodiment, the smart fire extinguisher device 10 can put itself in dormant hibernation mode to save battery and it has a timer onboard that can wake up and re-activate the device on a schedule that can be dynamically set. The device has the algorithm and intelligence either through the control module or inputs from network servers or smart devices (such as a mobile application interfacing with a human), to choose wake-up and data collection schedules based on whether human activities are detected. When human activities are detected, the device can set longer wake-up intervals to save battery power.

In another exemplary embodiment, the smart fire extinguishing device 10 is connected to a SaaS service platform 260 that can use multiple cloud-based servers 230 to provide the SaaS service. The SaaS service provides a variety of services such as management, fire monitoring, alerting, and extinguishing including registration of smart devices, registration of device owners (i.e. users), data collection, data archive, data analysis, and decisions making, alerting customers, messaging broadcasting and even subscription, extinguisher activation, and service for third-party providers and subscribers. The service platform 260 runs a plurality of data analysis models and artificial intelligence (AI) models to detect and identify abnormal conditions indicating or predicting fires. Data collected include sensor types, sensor configuration values, sensor time series values, onboard battery levels, device locations, nicknames, owner information, device historical data, and other data related and useful for serving customers.

Further, the SaaS service platform can record the location of a smart device 10 and the closest fire station 220. When the device 10 detects a fire, the service platform 260 can identify and notify the closest fire station 220 about the fire emergency.

In another exemplary embodiment, device owners 250 can set preferred configuration parameters (such as fire alert temperature and extinguisher activation temperature, etc.) through remote user interfaces 240 and the service platform 260. The service platform 260 can recommend and set default values based on a variety of factors such as industry standards and recommendations, historical data collected from the device, geographic and seasonal climatic condition of the device, and device owner's preference, etc. The preferred configuration parameters can be unique for each device.

In another exemplary embodiment, unique smart intelligence and prediction models can be created for each unique device and stored on the device and at cloud servers 230. The service platform 260 can apply a variety of models (such as data analysis, data processing, pattern recognition, decision-making, AI, and other logics and models) to process historical sensor data collected from the same smart fire extinguisher device 10 to establish unique prediction models for the device 10. When detected sensor values suddenly deviate significantly from the historical means at a specific time period, the smart AI prediction model can recognize it as a fire emergency and send out a fire alert. For example, if a smart device 10 has been reporting ambient temperature always in the range between 70 to 76 degrees Fahrenheit in the past six months and suddenly detects a temperature of 82 degrees Fahrenheit, the smart AI prediction model can recognize this as a fire emergency and send out a fire alert even though 82 degree is not close to the temperature of a real fire. Another example is when a device suddenly detects an ambient temperature of 86 degrees at 2:00 a.m. where the historical data only shows that 86 degrees temperature was only recorded on the same device during the day and never around 2:00 a.m., the smart AI prediction model can recognize this as a fire emergency and send out a fire alert.

Further, the smart AI prediction model can be unique for each device 10 based on the device's unique historical data patterns. The smart AI prediction model can be expressed and stored as a set of rules and managed by a rule-based engine. In addition, the smart AI prediction model can be by the device 10 and/or by the service platform 260. Further, the smart AI prediction model can be combined and consolidated. For example, when the device generates certain rules, the rules can be uploaded to the service platform 260 which has more powerful processing powers and more models. After combining and consolidating the smart AI prediction models, the new model can be transmitted to the smart device 10 to update the prediction model on the device 10.

Figure 3:
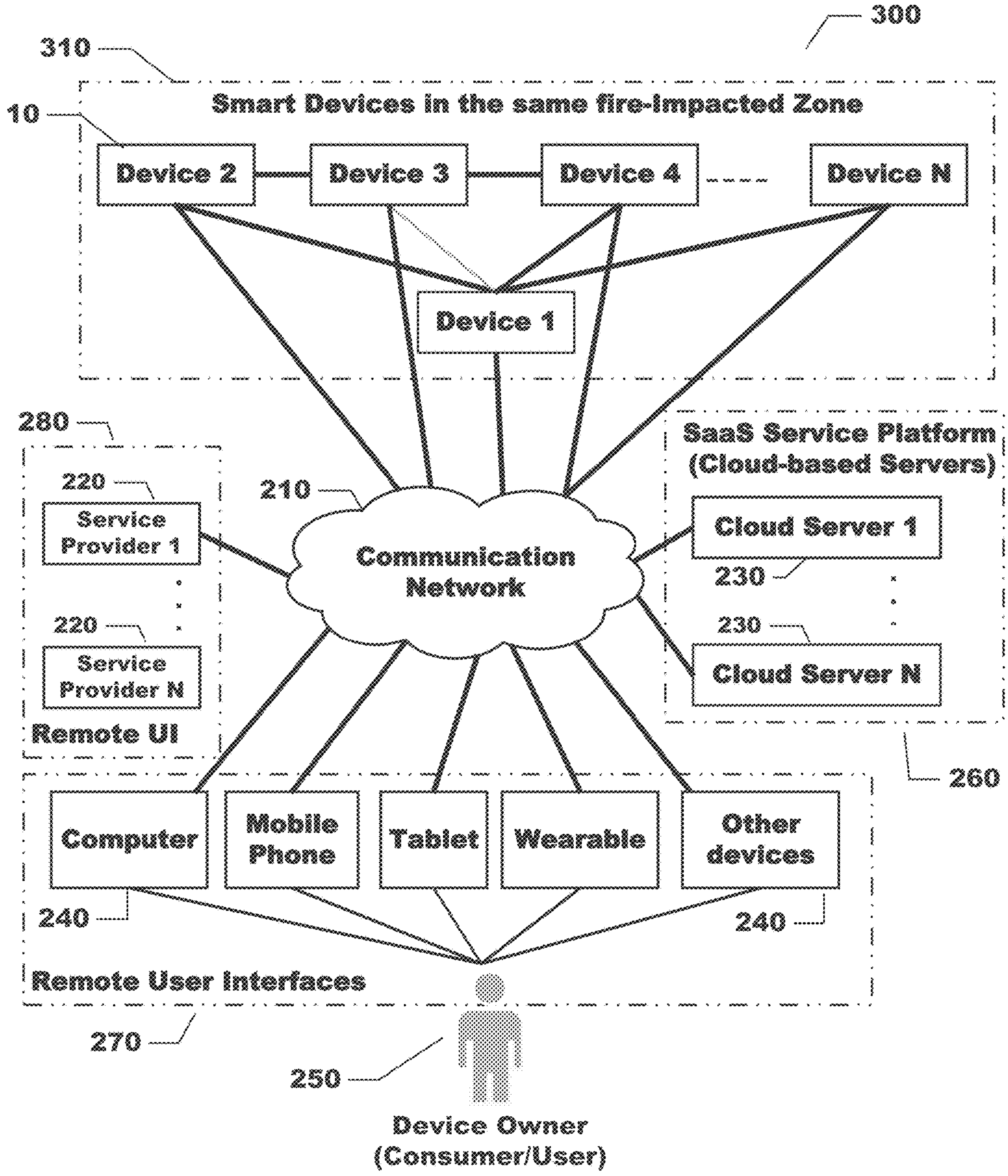
FIG. 3 is a schematic diagram of one embodiment of a Smart Fire Extinguishing System, according to the principles of the present disclosure, including a plurality of IoT Smart Fire Extinguishers, whereas when a first IoT Smart Fire Extinguisher detects fire hazards, other same Smart Fire Extinguisher devices in the local vicinity (such as in the same building or neighboring houses) that may be impacted by the fire hazard can be notified by the first device or the SaaS service platform.

Referring to FIG. 3, in one exemplary embodiment of the present disclosure, a smart fire extinguishing system consists of a plurality of smart fire safety devices 10 (Device 1 through Device N) capable of notifying each other when one device detects fire hazards; a service platform (260), remote user interfaces (270) and device owners (250), and service providers and subscribers (280). Devices in the same local fire-impact zone (310) (such as Device 1 to Device N in FIG. 3.) are the devices that can be impacted by a fire detected by any other devices in the same zone. For example, when a device in one apartment unit detects a fire, adjacent apartment units may be impacted by the same fire. Thus all devices in the same apartment unit where the fire happens and devices in the adjacent apartment units that will be impacted by the same fire are defined as in one same local fire-impact zone.

Referring to FIG. 3, in another exemplary embodiment of the present disclosure, the SaaS service platform 260 can record the location of each smart device 10 and determine what other devices are in the same local fire-impact zone. When a fire is detected, the service can alert all devices in the same fire-impacted zone. Upon receiving a fire alert from one device 10, the service platform 260 can inform device owners 250 of all devices in the same impacted zone about the fire and its location. The service platform can also activate alarms on all devices 10 in the same fire-impacted zone to alert people in the same zone about the fire emergency. This is especially useful for neighbors living in the same apartment building or townhouses where a fire in one unit can quickly spread to the neighboring apartment units or townhouses. It helps expand the fire alert area and provides advanced early fire alerts which give people in the same fire-impact zone more time to respond.

Referring to FIG. 3, further, when Device 1 detects a fire, it can broadcast the fire emergency to communicate with all other local devices that subscribe to the same fire alert broadcast channels, event queue, and/or other IoT inter-device communication mechanisms such as MQTT (Message Queue Telemetry Transport), AMQP (Advanced Message Queue Protocol), DDS (Data Distributed Service), XMPP (Extensible Messaging and Presence Protocol), etc. Device 1 to N can belong to one or more device owners, and of different models/types. For example, Device 1 can be a Standard Model device with the capability to detect a fire and communicate with the service platform and other devices. Device 1 can be deployed in the kitchen. Device 2 can be an AI arm Model device that can receive an alert from Device 1 to sound alarms. Device 2 can be deployed in the bedroom on a different floor. Both Device 1 and 2 belong to the same owner and are deployed in the same house. When one device, such as Device 1 in the kitchen, detects a fire, it can notify other devices in the same fire-impacted zone, such as Device 2 in a bedroom in the same house or apartment, to sound alarms to warn people. Such notification can be through the aforementioned broadcast channels, event queues, networks, or direct peer-to-peer communication. In another example, Device 1 can be in an apartment on the first floor and Device 3 can be a device on the 10th floor in the same apartment building. When Device 1 detects a fire, it can broadcast the alert. Device 3 can receive the broadcast alert and sound alarms to alert its owner that a fire emergency arises in the same apartment building.

In another exemplary embodiment of the present disclosure, the SaaS service platform 260 provides each device owner 240 an option to either subscribe or opt out fire-impacted zone early fire alert subscription service.

Figure 4:
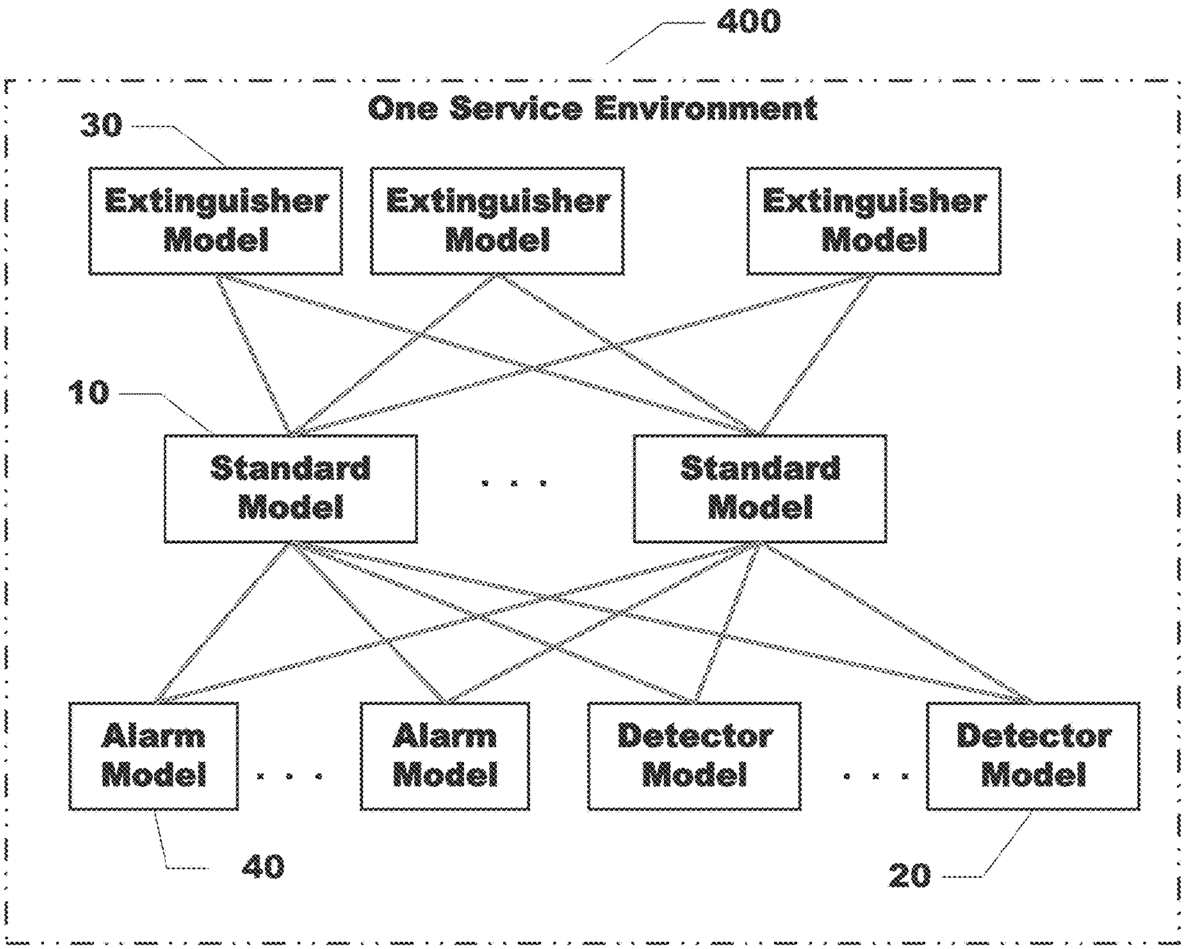
FIG. 4 is a schematic diagram of another embodiment of a Smart Fire Extinguishing System, according to the present disclosure including different models of IoT Smart Fire Extinguishers deployed in a combination in the same environment (such as different floors within the same house) under one user account so as to improve efficiency and effectiveness of fire protection at lower costs.

Referring to FIG. 4, in another exemplary embodiment of the present disclosure, one service environment (400) can have a plurality of devices of different models 10, 20, 30, 40. Devices in one service environment belong to one owner. Different models of devices are chosen to complement each other to achieve the maximum performance of fire detection, alerting, and suppression at the lowest costs. For example, a standard model device 10 can be deployed to a potential fire source, such as a kitchen stove. To reduce costs while enhancing extinguishing power, one or more extinguisher model devices 30 can be deployed at the same location without adding more standard models. This reduces the redundant detection and communication modules. Similarly, one or more alarm model devices 40 can be added to a bedroom where the alarm sound from the device in the kitchen cannot be heard. This expands the alarm area without adding the unnecessary costs of using standard model devices 10. Additional detector models 20 can be used to help detect a fire situation. The devices in one service environment can talk to each other through IoT broadcast service or peer-to-peer communications. So when one device detects fires and sounds alarms, all devices in the same smart fire extinguishing system in the same fire-impacted zone can sound alarms to expand the area of locations where alarms can be heard. Service Environment grouping helps improve the efficiency and effectiveness of the smart fire firefighting system and reduce costs.

Figure 5:
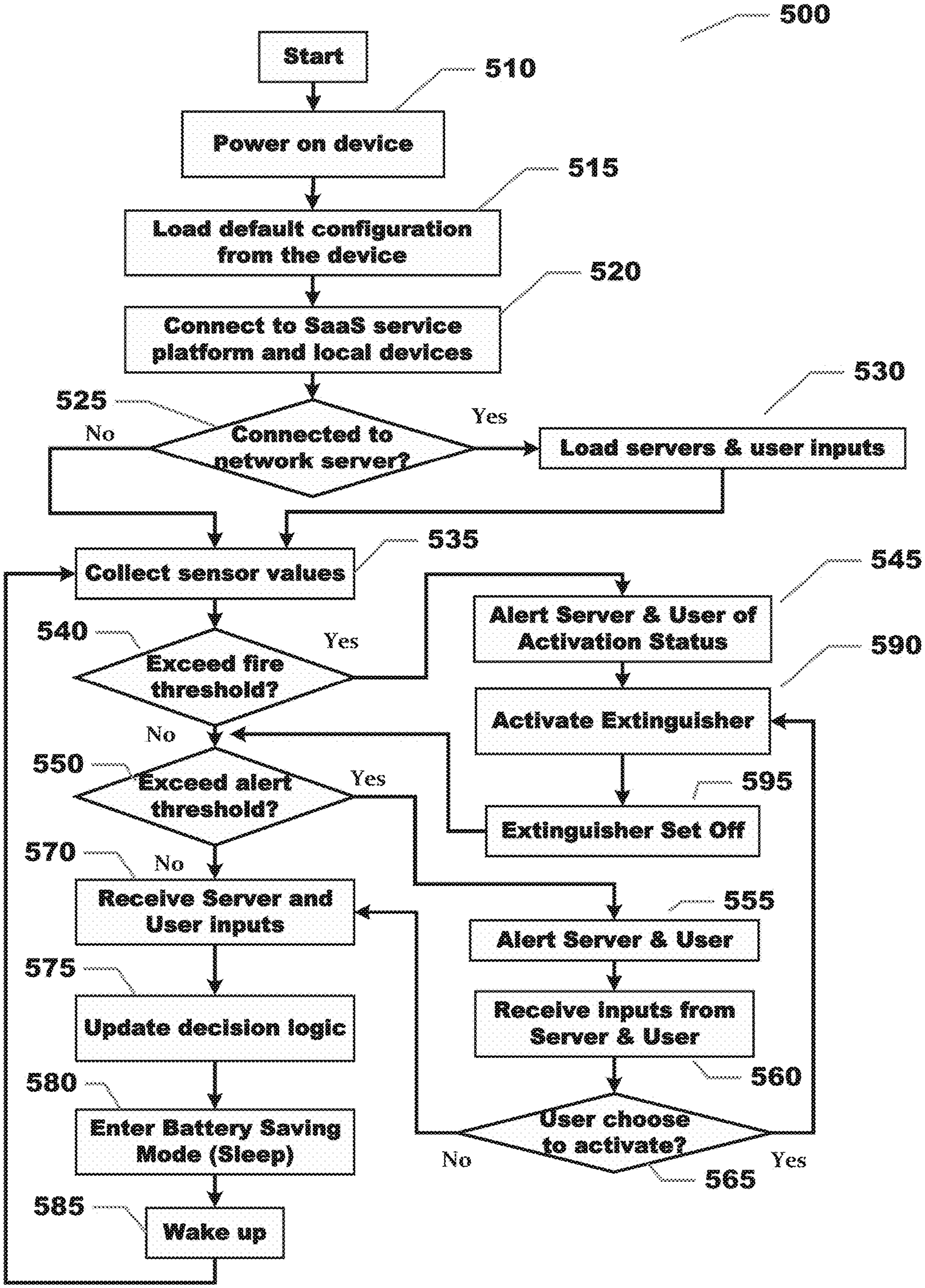
FIG. 5 is a schematic diagram of the workflow of the IoT Smart Fire Extinguisher device according to the present disclosure.

Referring to FIG. 5, in another exemplary embodiment of the present disclosure, the workflow (500) and methods (510 to 585) of operating a smart fire extinguisher device are explained. Once the smart fire extinguisher device is powered on (510), it loads default configuration parameters from the device onboard control unit. The device then tries to connect to the other devices in the smart fire extinguisher system (520) (such as devices in the same fire-impacted zone and devices in the same service environment). At step 525, if the device is successfully connected to the SaaS service platform, it will load server configuration parameters and user input data from the SaaS service platform (530). If the device fails to connect to the SaaS service platform at step 525, it will operate as an independent device. Then the device starts to collect sensor values (535). Once sensor values are read, the device applies processing logic stored on its control module to determine whether a fire threshold (i.e. ambient temperature indicates a real fire exists) is exceeded (540). If it is, the device immediately sends alerts (545) to the service platform and activates the extinguisher (590) to put out fires (595). Now that the extinguisher module has been set off, the device can continue functioning as a detection model. The device determines (550) whether an alert (i.e. ambient temperature indicates an abnormal temperature condition and a potential fire hazard). If an alert is warranted, it sends an alert with other information to the service platform (555). The service platform (through the remote user interfaces) sends back commands and information and commands from the service platform and the device owner (560). If the commands include activation of the extinguisher (565), the device activates the extinguisher (590). Otherwise, it processes the information from the server platform and the device owner (user) (570). The device then updates (575) its decision logic (including any processing models, configuration parameters, and threshold values, etc.) Then depending on the new sampling schedule, the device can enter a battery-saving mode (580). At step 585, the device wakes up and starts the next cycle of collecting sensor data (535).

Figure 6:
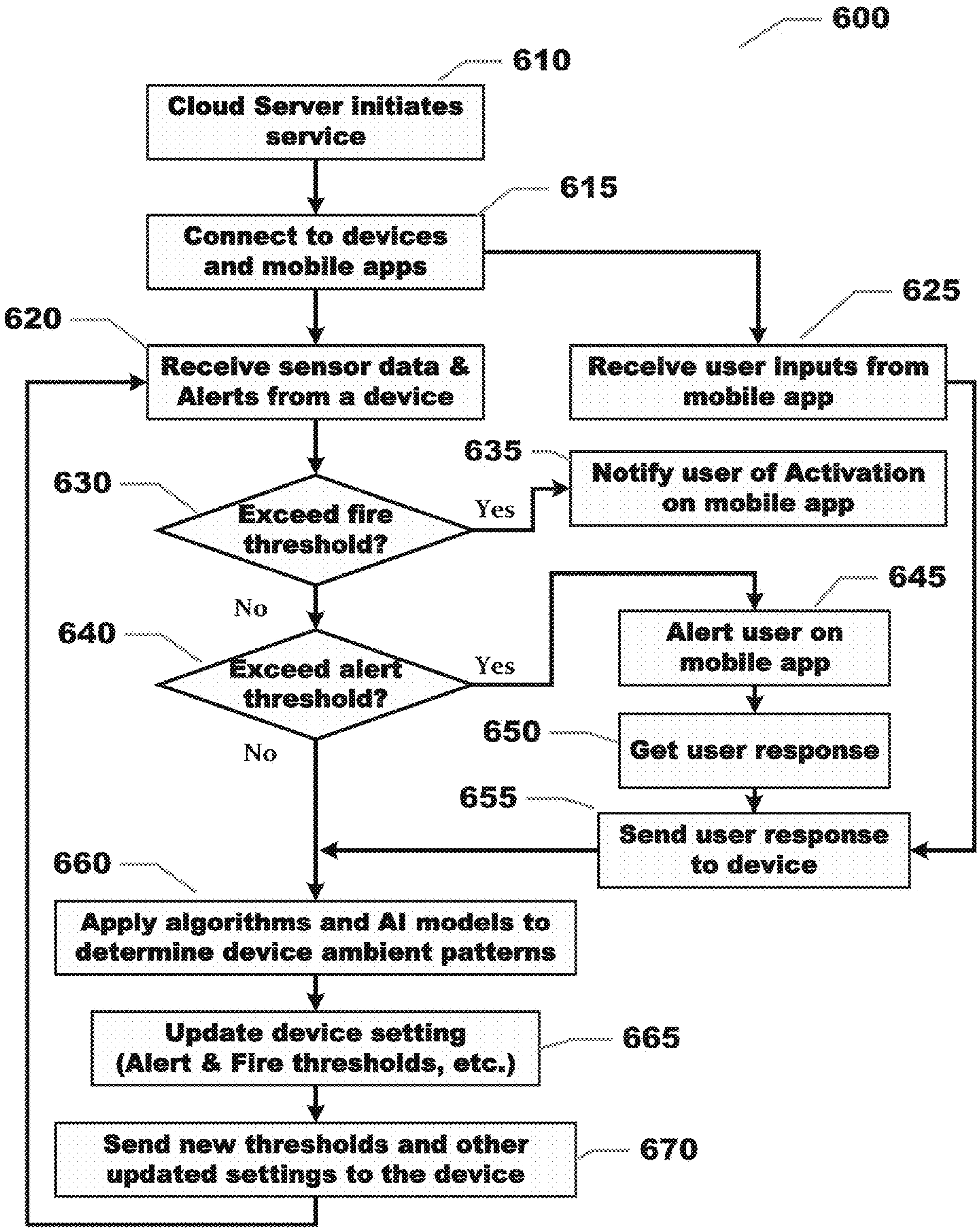
FIG. 6 is a schematic diagram of the workflow of the SaaS Service Platform according to the present disclosure.

Referring to FIG. 6, in another exemplary embodiment of the present disclosure, the workflow (600) and methods (610 to 670) of operating the SaaS service platform 260 are explained. The service platform initiates all its cloud servers (610). The service platform 260 then connects to all smart fire extinguisher devices, remote user interfaces, and third-party service providers and subscribers (615). The service platform can simultaneously support a plurality of smart fire extinguisher devices, remote user interfaces, and third-party service providers and subscribers. It can receive user (device owner) inputs through mobile apps (625) and relay user inputs to the user's corresponding smart device (655). The service platform can also receive sensor data and alerts from a smart device (620) and then apply logics and models to determine whether a fire threshold has been exceeded (630). If exceeded, it notifies the device owner 250 (user) that a fire happens and the extinguisher on the device 10 has been set off (635). If the fire threshold is not exceeded, the service platform will apply logics and models to determine whether an alert threshold has been exceeded (640). If exceeded, the device will alert the device owner on the mobile app (645) and wait for the device owner to respond (650). If the device owner chooses to activate the device, the service platform immediately sends the activation request to the smart device (655). If the device owner does not respond with any mission-critical commands, the service platform will apply a variety of algorithms and models to process device status, sensor data, and inputs from device owners including establishing device ambient patterns (660). The service platform then updates the device with its processing results and user inputs (650). The service platform then sends new thresholds and other updated settings to the device (670). This completes a loop of interacting with a smart device. The service platform then goes into a new loop to receive data from a smart device (620).

Figure 7:
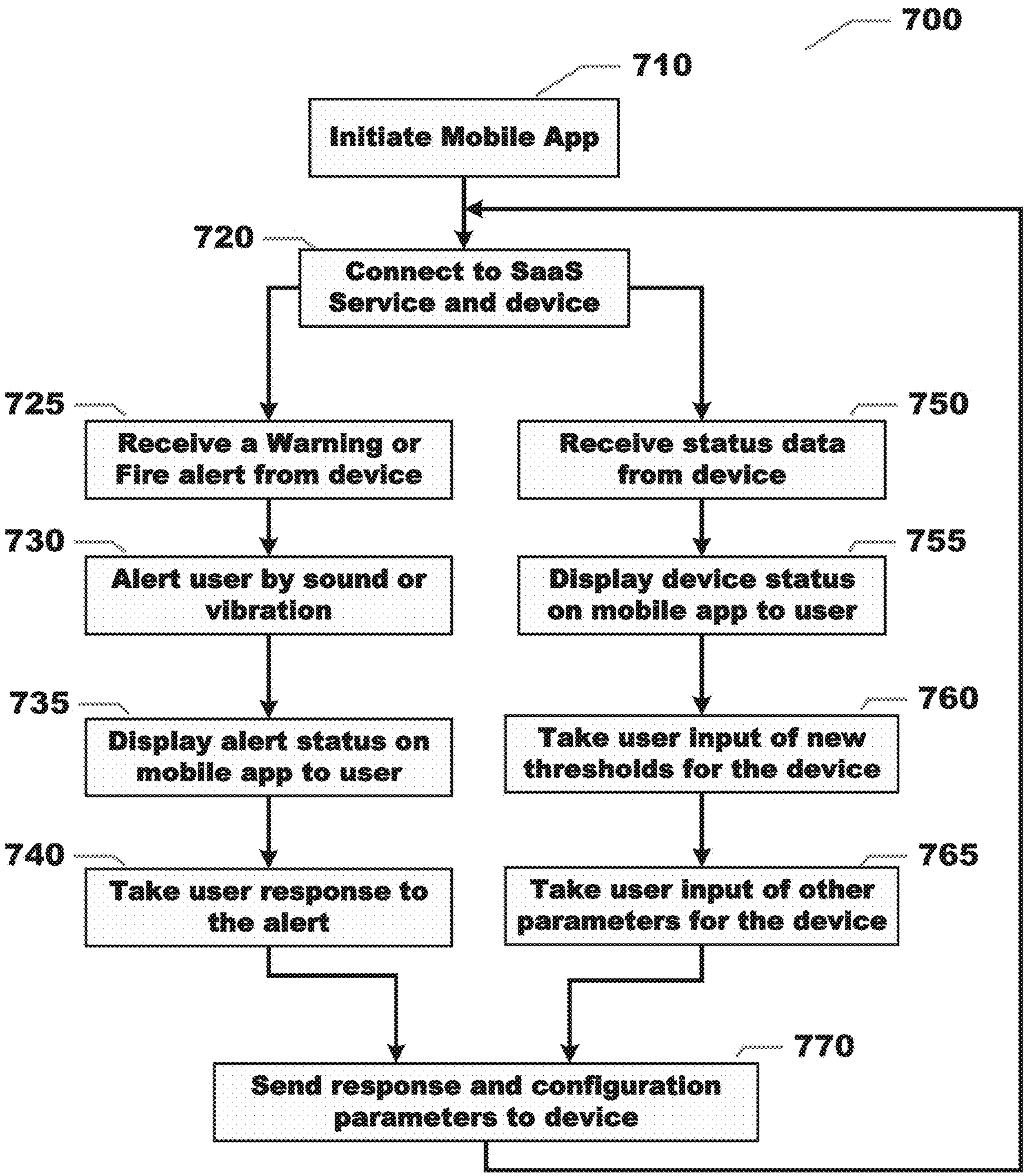
FIG. 7 is a schematic diagram of the workflow of a mobile app according to the present disclosure.

Referring to FIG. 7, in another exemplary embodiment of the present disclosure, the workflow (700) and methods (710 to 770) of how a device owner 250 interacts with a mobile app are explained. First, the mobile initiates (710). Then the app connects to the service platform 260 and the smart device 240 (720). Once connected, the mobile app can receive two types of information. The type is the mission-critical alert information. The second type is the non-critical device status information. When the mobile app receives a fire or warning alert (725), it will alert the device owner by making loud alarm sounds and/or making the phone vibrate (730). The mobile app will display relevant alerts and device status information to the device owner (735). The app will then capture inputs from the device owner (740) and then send user responses along with other configuration information through the service platform back to the device (770). In parallel, when the app receives non-critical device status (750), it displays the information only when the device owner opens the app (755). The app then takes user inputs of new thresholds (760) and other configuration parameters (765). Finally, the app sends the user response along with other configuration information through the service platform back to the device (770).

Figure 8:
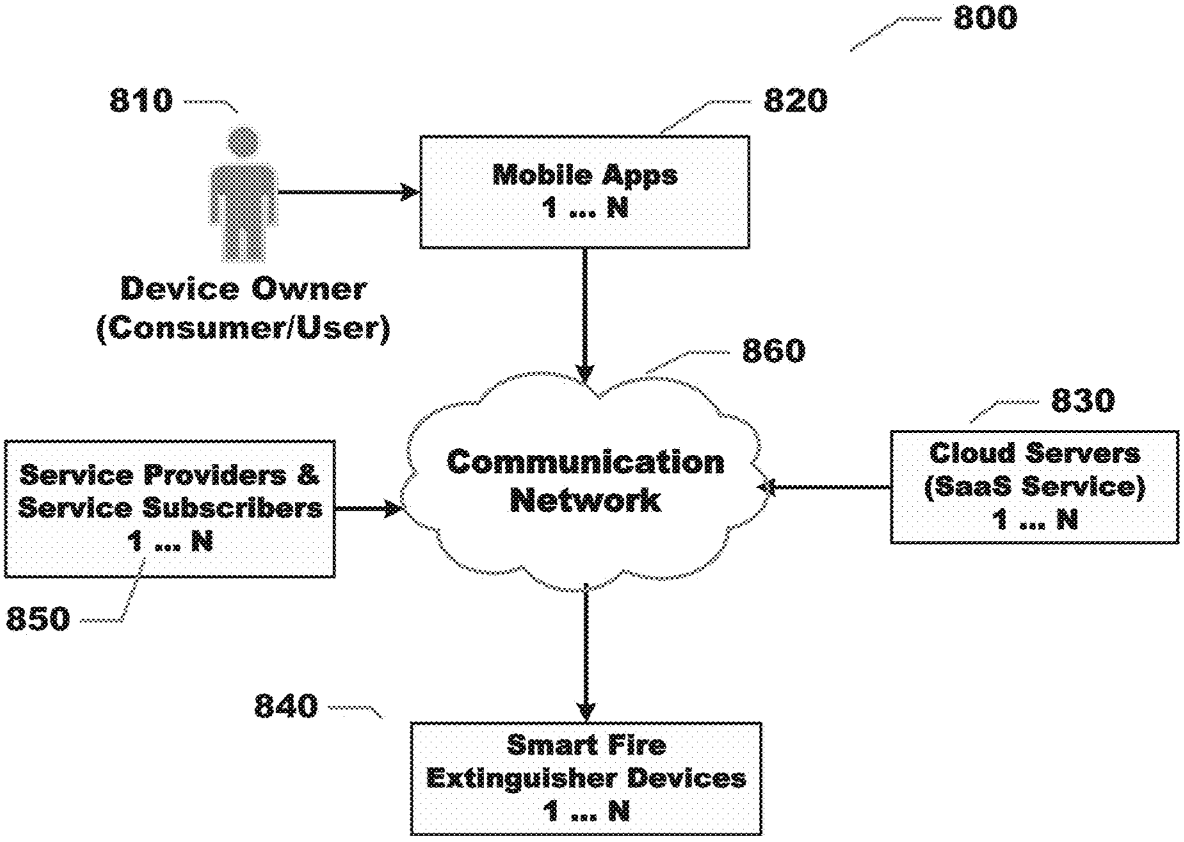
FIG. 8 shows a decision process to activate and set off the smart fire extinguisher that can be made at three levels—by end users (810) through mobile phones (820), by the cloud-based SaaS servers (830), and by the Smart Fire Extinguisher device (840)

Referring to FIG. 8, in another exemplary embodiment of the present disclosure, a plurality of smart fire extinguisher devices (840), a plurality of mobile apps running on mobile devices (820), a plurality of service providers and service subscribers (850), and a plurality of cloud servers can be connected through one or more communication network (860). This allows one mobile app 820 to be connected to and control a plurality of smart extinguisher devices 840. For example, a user 810 can use a mobile phone 820 to manage multiple smart devices 840 deployed at different locations. As another example, one smart extinguisher device 840 can be managed by multiple users 810 on multiple mobile phones 820, PCs, and/or other remote user interface equipment. As another example, a plurality of service providers and/or service subscribers 850 (such as fire departments, fire stations, home security monitoring companies, insurance companies, hospitals, medical professionals, etc.) can be added to the SaaS service platform to provide additional services to device owner 810 and/or receive information gathered by the smart device 840. As another example, the communication network (860) can be different types of networks and in different geographic areas. The same structure as illustrated in FIG. 8 can be formed at different scales, sizes, combinations, etc. For example, it can be formed in a building, in a community, within a company, at one geographic location, or in multiple geographic locations, etc. Different types of networks can be mixed, connected, expanded, and added to form a bigger service network. For example, a senior community can have its own smart fire extinguisher system and its own service platform. This local service platform can be connected to a similar service platform owned by a third-party service provider or subscribers such as a security monitoring company or added to a public fire-fighting system. The setup in FIG. 8 allows the flexibility and possibility to form more complex systems. In addition, it does not have a central failure point. When any component of 820 to 860 fails, it can be easily replaced without impacting other components.

Figure 9:
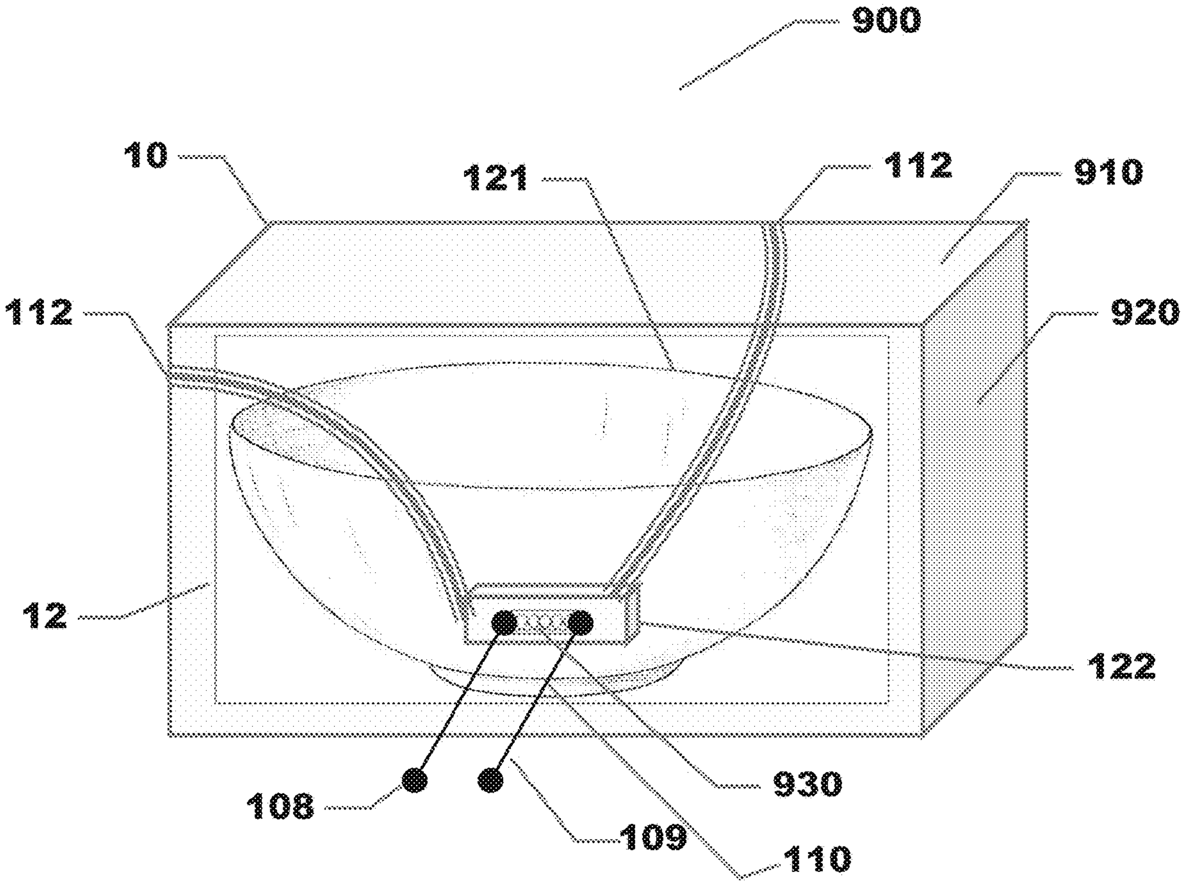
FIG. 9 shows an exemplary structure of the Extinguisher Unit (12) inside the smart fire extinguisher device (10)

Referring to FIG. 9, in one exemplary embodiment of the present disclosure, shows the structure and components inside the Extinguisher Unit (12) of the smart fire extinguisher device (10). In one embodiment, the Extinguisher Unit (12) consists of an Extinguisher Agent Module (121), an Activation Module (122), an electric charger (930), electric wires (110), Plug-and-Play connectors (108, 109), and a plurality of fuses (112) which connect Activation Module (122) with the device's top surface (910) and the four side surfaces (920). The Extinguisher Agent Module (121) is filled with fire-extinguishing chemical agents and has a shape, such as a bowl shape shown in FIG. 9, which can generate directional release of the chemical agents towards the opening side of the bowl under the frangible portion of the top surface of the device. The Extinguisher Agent Module 121 can be made of molded lightweight high-density materials such as polyethylene or ethylene based materials or the like which are strong enough to withstand heat and contain the explosive force without deforming or cracking.

In one exemplary embodiment of the present disclosure, the housing case of the smart fire extinguisher device (10) can appear to be a decorative item hanging on a wall like a painting or mural. It will have a height tall enough to host the control unit 11 and the extinguisher unit 12. The top 2-D surface can have different shapes including but not limited to Circle, Triangle, Square, Rectangle, Kite, Star, trapezium, Parallelogram, Rhombus, and different 3-D shapes including but not limited to Cube, Cuboid, Sphere, Cone, and Cylinder, etc. In addition, the housing case of the smart fire extinguisher device can have a measured and molded internal mounting structure to mount and host the smart fire extinguisher. This allows different shapes and sizes of housing cases to be swapped while all can host the same smart extinguisher device. With different housing appearances, the same smart extinguisher device can easily fit with a different environment.

Depending on the outer shape of the smart fire extinguisher device (10), the Extinguisher Agent Module (121) can use different shapes to achieve the best effect of spurting out extinguishing agents directionally out of the top surface of the device. The shape of the Extinguisher Agent Module 121 can be a bowl, a cone, a tetrahedron, a square pyramid, a hexagonal pyramid, a cylinder, a pentagonal, a triangular prism a half octahedron, a half sphere, a half an olive, etc.

The Activation Modules (122) of the Extinguisher Unit (12) can use different activation mechanisms. One way to activate it is to use compressed air, such as nitrogen or CO2, an activation command from the control unit will release compressed air from a canister. The spontaneous release of compressed air will cause a controlled and measured explosion to spontaneously release extinguishing chemical agents. Another way to activate is when the Control Unit 11 of the device 10 sends an electric charge or command through the electric charger (930) which will generate sparks to activate the combustible and explosive agents (such as black powder or black powder substitute like Pyrodex etc.) inside the Activation Module (122). Yet, another way to activate the extinguisher is when the fuses 112 at the surface of the device are ignited, for example by a fire. The burning fuses will ignite and activate the combustible and explosive agents inside the Activation Module (122). After the Activation Module is activated, it generates enough pressure that will generate a force strong enough to spontaneously release extinguisher agents inside the Extinguisher Agent Module (121) by breaking the frangible portion of the top surface of the extinguisher device. The force, from compressed air and/or combustible agent, can be calibrated by controlling the amount of compressed air and/or combustible agents so that the force is only sufficient to spontaneously release the fire extinguishing agents for best extinguishing effects but insufficient to cause any injuries to humans in the vicinity of the device.

Referring to FIGS. 10*a*-10*b*, a prototype of one possible embodiment of the present disclosure is shown. A perspective view of the prototype 1000 of the smart fire extinguisher device 10 showing a hard top surface portion (1010), a frangible top surface portion (1020), and the sides (1030) of the device. FIG. 10*b* is a top view of the internal structure of the smart fire extinguisher device when the top surface (1010 and 1020) of the device is removed and opened. It shows, among other omitted components, a Control Unit (11), an Extinguisher Unit (12), electric wires (110), an Extinguisher Agent Module (121), an Activation Module (122), and an internal wall (1040) separating the Control Unit (11) from the Extinguisher Unit (12).

The frangible portion of the top surface (1020) covering the top of the Extinguisher Module (111) is made of frangible material (such as Styrofoam, thin plastics, films, etc.). It can be broken by an explosive force generated by the Activation Module to allow the fire extinguishing agents to be spontaneously released evenly and uniformly. The explosion force of the Activation Module is designed to be strong enough just to break the top surface (1020) to evenly and uniformly release fire extinguishing agents but not to hurt humans or cause damage to other components of the device.

The internal wall (1040), separating the Control Unit (11) from the Extinguisher Unit (12), is strong enough to withstand the explosive force and heat when the activation module explodes to release extinguishing agents and can protect the control unit 11 from any damages when the extinguisher unit 12 sets off. The control unit (11) can be air-tight attached and sealed to the outer housing case (not shown in the picture) so that the extinguishing agents and debris cannot get in to damage the control unit 11*s*.

Figure 11B:
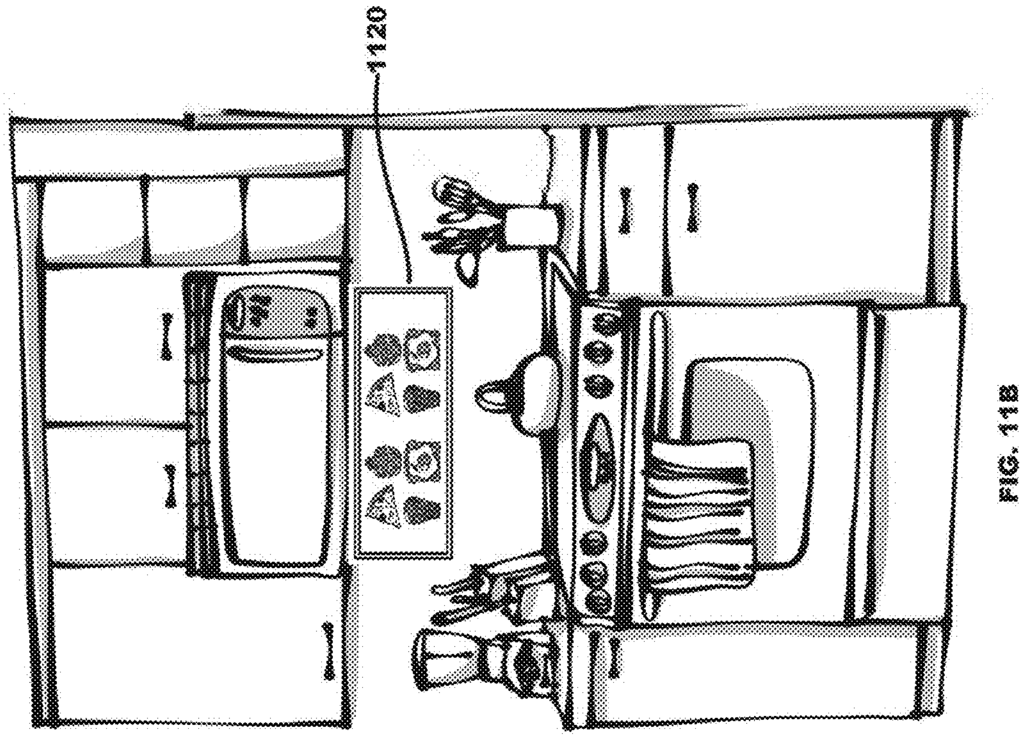
FIGS. 11*a* and 11*b* show a decorated embodiment of the Smart Fire Extinguisher device and how the device can be deployed and installed in a kitchen of a house.
Figure 11A:
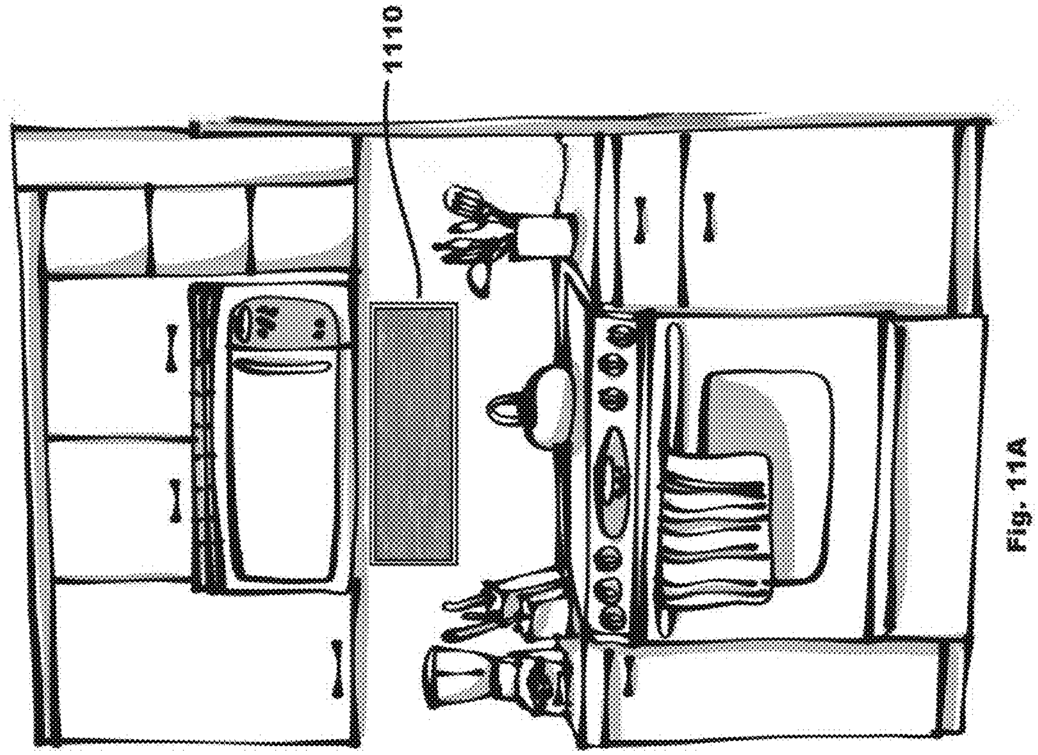

Referring to FIGS. 11*a* and 11*b*, a prototype of one possible embodiment of the present disclosure. FIG. 11*a* shows the smart fire extinguisher device mounted on the wall above a cooking range. In this picture, the decorative skin of the device is removed to show the frangible cover 1110 (the white color surface on the left) of the device. FIG. 11*b* shows the same smart fire extinguisher device with a decorative skin 1120 on the top. This makes the device look like a decorative item such as a painting mounted on the wall. The overall effect is to make the device aesthetic and fit well with the indoor home environment.

Referring to FIGS. 11*a* and 11*b*, in one exemplary embodiment of the present disclosure, the device (1120) can have different sizes, shapes, and covering skins/paintings. For example, the device can be thinner and longer to cover the whole wall area between the stove and the hanging microwave and have a painting content related to food and cooking. This can make the device better fit and blend well with the home kitchen decoration style and environment.

Referring to FIGS. 11*a* and 11*b*, in one exemplary embodiment of the present disclosure, the device (1120) can have an aesthetic, ornamental housing case of different sizes and shapes, and be covered with different decorative skins/paintings. The appearance of the housing case will make the device fit well with indoor environments to which it is deployed. In addition, the device can be deployed close to the potential fire sources, such as on a wall in the kitchen close to a range or stove or on a wall in a bedroom close to an electric blanket, without appearing as an eyesore or intruding. Such housing case can look like a painting or mural with different 2-D surface shapes like Circles, Triangles, Squares, Rectangles, Kites, Stars, trapeziums, Parallelograms, Rhombuses, and different 3-D shapes like Cubes, Cuboids, Spheres, Cones and Cylinders, etc.

It is another object of the smart fire extinguishing device to have a housing case with a mounting mechanism that allows it to be easily mounted to walls and ceilings and to be close to potential fire sources without the need of cutting drywalls or retrofitting the existing building structure or expensive professional installation. The installation will be easily handled by a layperson consumer. For example, the housing case can be mounted to the wall above the kitchen cooking range or to the ceiling right above a location where a heating blanket is used. In another example, the device can be easily mounted to walls and ceilings using a plurality of double-sided tapes or dry-wall screws.

In one exemplary embodiment of the present disclosure, the Extinguisher Unit 12 can be easily taken out from the smart fire extinguishing device 10. When the Extinguisher Unit 12 is thrown into a fire, the fuses connected and embedded on the surface of the device can be ignited and set off the extinguisher to spontaneously release extinguishing agents to put out fires.

Figure 12:
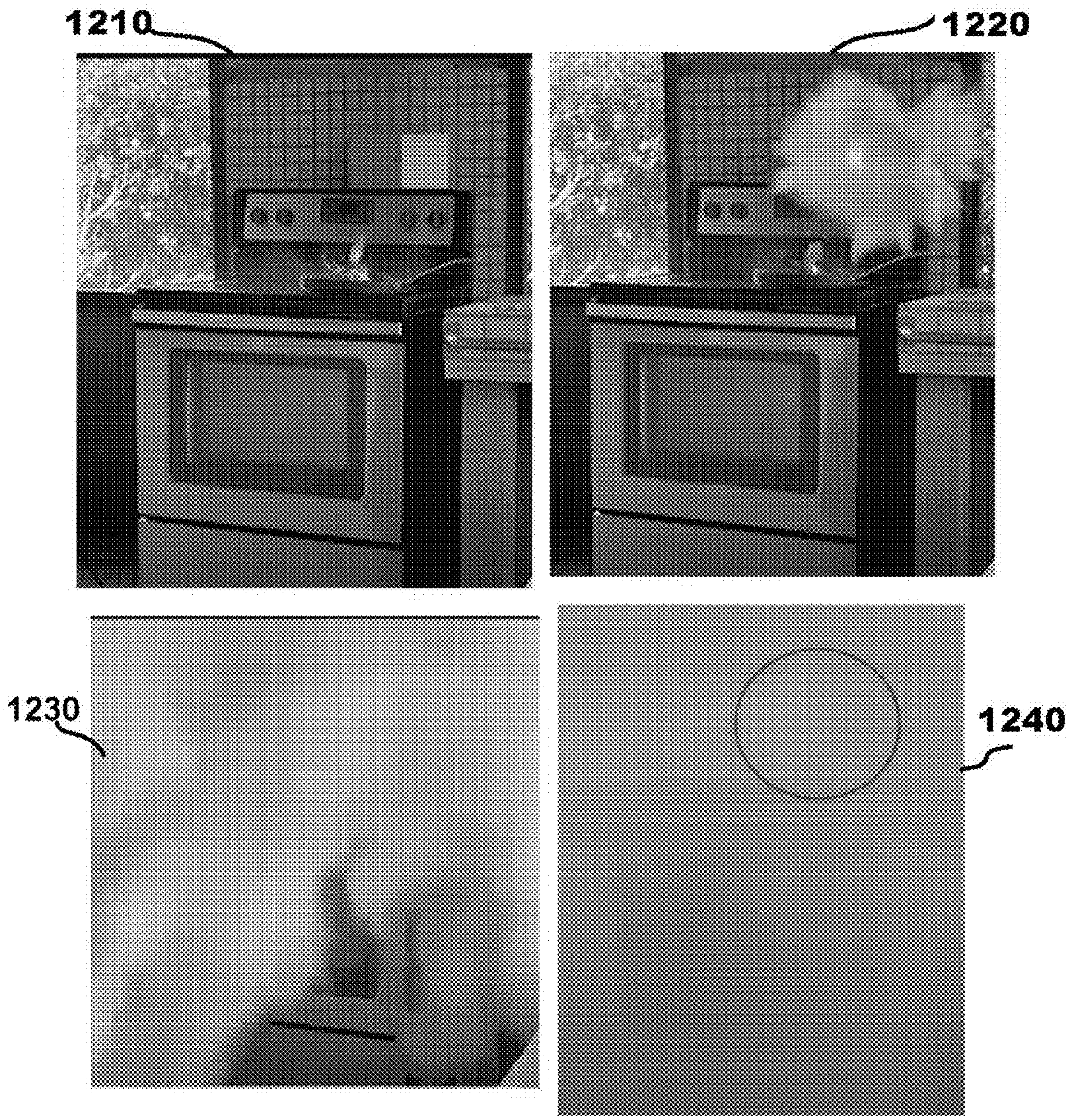
FIG. 12 shows four sequential photos out of a video of a prototype of one embodiment of the Smart Fire Extinguisher device and how the device is activated to extinguish a fire on a stove top.

FIG. 12 shows four pictures in a sequence (1210 to 1240) of a prototype as one exemplary embodiment of the present disclosure being tested in real life. The four pictures are taken out from a video recording of how the prototype of the smart fire extinguisher automatically activates to spontaneously release extinguishing agents and successfully put out a real fire. Picture 1210 shows a fire starting on a stove top. Picture 1220 shows the extinguisher unit on the device has just been activated to spontaneously release extinguishing agents using explosive force. Picture 1230 shows the released extinguishing agents that cover a sufficient area in front of the smart extinguisher device. Picture 1240 shows the kitchen fire is completely and successfully extinguished.

In another exemplary embodiment of the present disclosure, a first smart fire extinguisher device can be mounted on a mobile platform, such as a drone or a moveable robotic platform. When a second smart fire extinguisher device in the same fire-impacted zone detects fires, it can notify the first smart fire extinguisher device, which can then move to be close to the fire location that is detected by the first device. When the mobile platform moves the second device to be close inside an effective distance, the second device can decide to set off its extinguisher module 12 to put out the fire. A same fire-impacted zone thus can have a plurality of Extinguisher Models 30 of the smart device deployed by the mobile platform to provide more extinguishing agents and maximize fire suppression effects.

Advantageous Effects of the Disclosure

To accomplish the above objects, according to one embodiment of the present disclosure, there is provided a smart fire extinguisher device comprising: at least one extinguisher agent module filled with fire-extinguishing chemical agents; at least one activation module that when activated can spontaneously release said extinguishing chemical agents to extinguish fires; at least one control module (FIG. 1, 105) having at least one computing processor and at least one non-transitory computer-readable medium having instructions including algorithms, logics, and models stored thereon that when executed by one or more said processors cause said control module to: transmit commands to activate said extinguisher module to spontaneously release extinguishing chemical agents to extinguish fires.

According to another embodiment of the present disclosure, the aforementioned smart fire extinguisher device may further comprise at least one alarm module with at least one speaker capable of sounding alarms; a manual activation mechanism (107) (such as a button or switch) whereby it can activate said extinguisher module to spontaneously release extinguishing chemical agents to extinguish fires.

According to another embodiment of the present disclosure, the aforementioned smart fire extinguisher device may further comprise: at least one detection module having a variety of types of sensors capable of sensing and capturing a variety of ambient conditions of said device; at least one control module having at least one computing processor and at least one non-transitory computer-readable medium having instructions including algorithms, logics, and models stored thereon that when executed by one or more said processors cause said control module to: retrieve and read all sensor values from said detection module, determine whether the ambient condition of said device indicates that a fire or a potential fire hazard is present, and responsive actions such as sound alarms or activate extinguishers; transmit commands, whereupon the presence of fire is determined, to activate said extinguisher unit to spontaneously release extinguishing chemical agents to extinguish fires.

According to another embodiment of the present disclosure, the aforementioned smart fire extinguisher device may further comprise: at least one power module that provides electric power to said smart fire extinguisher device using battery and/or power connected to a wall outlet; at least one alarm module with at least one speaker capable of sounding alarms; at least one IoT-enabled communication module capable of communicating wired and/or wireless with other IoT devices, equipment, and networks (including devices and servers connected to said networks); and at least one encryption module capable of providing device-level sign-at-source encryption, cybersecurity, and protection from hacking; wherein said at least one control unit can conduct further actions to communicate, through said communication module, with other devices, equipment, and network to transmit and/or receive data including commands; wherein with input data from network servers, said control unit may update device profile, configuration, firmware, and other data; determine whether a fire or a fire warning arises; activate said alarm module to sound fire alarms when a fire alarm or a fire is present; and transmit a command, when a fire is present, to activate said extinguisher unit to spontaneously release extinguishing chemical agents to put out fires; wherein said instructions may include a variety of softwares, algorithms, and models that are installed on said devices and/or updated and transmitted from networked servers or equipment; and wherein said control unit may use the aforementioned encryption module when communicating with outside devices and/or networks to provide device-level sign-at-source encryption, cybersecurity, protect said device from hacking.

According to another embodiment of the present disclosure, the aforementioned smart fire extinguisher device can be divided into at least two units, wherein a first unit forms the extinguisher unit (111 in FIG. 1) which contains an extinguishing agent module (121 in FIG. 1) and an activation module (122 in FIG. 1); wherein a second unit forms the control unit which contains some combination of a control module, a detection module, an alarm module, a communication module, an encryption module, and a power module; wherein said control unit is connected with said extinguisher units through a plug-and-play connector, allowing said control units and said extinguisher units be replaced separately and independently, as plug-and-play swappable components, without affecting other units.

According to another embodiment of the present disclosure, the aforementioned smart fire extinguisher device may further comprise at least two device cases, wherein one or more first case host the extinguisher unit and has at least one or more pre-designated sides of the case made of frangible material that can be broken to allow extinguishing agents be spontaneously released directionally towards one or more pre-designated directions targeting potential fire sources, and other sides made of materials strong enough to withstand heat and explosive and not let extinguishing agents to get through; wherein one or more second case hosts a control unit and has all sides of the case made of materials strong enough to withstand explosive force and heat and can protect the control unit from any damages when the extinguisher unit sets off; wherein there can be a plurality of said second cases. For example, a device may have multiple control unit cases used to host multiple detection modules and control modules. This allows detection modules to be positioned close to potential fire sources for better detection effects and away from the extinguisher module so it will not be damaged and can be reused after the extinguisher modules set off.

According to another embodiment of the present disclosure, the aforementioned smart fire extinguisher device may further comprise an outer decorative housing case wherein said housing case has an inside holding structure molded to securely install and hold at least one said extinguisher device case and at least one control unit device case; wherein said housing case can have a variety of outer shapes and sizes, and a skin cover having a variety of decorative designs and appearances; wherein said housing case can have a plurality of mounting mechanisms (such as screws, adhesives, doubled sided tapes, etc.) which allow the housing case to be easily mounted to walls or ceilings without retrofitting; and wherein the combined flexibility of shapes, sizes, aesthetic appearances, and ease of installation makes said housing case aesthetically fit with indoor environments and easily deployed to be close to potential fire sources. For example, the housing case can hide one extinguisher unit device case and two control unit device cases inside, whereby the extinguisher unit can be directly facing a potential fire source and one control unit that has heat detectors being placed close to the potential fire sources and a second control unit that has more expensive control module and video camera be placed away from potential fire sources to better protect them from fire damages. The housing structure has molded internal structure to hold these three device cases at desired places securely.

According to another embodiment of the present disclosure, the aforementioned smart fire extinguisher device may further comprise an activation mechanism in its extinguisher unit that can be activated to set off said extinguisher unit to spontaneously release extinguishing chemical agent; and wherein said activation mechanism can be electronic, electric, mechanical, or chemical.

According to another embodiment of the present disclosure, the aforementioned smart fire extinguisher device may further comprise a plurality of fuses with one end connecting to the activation module and the other end connecting to the surface of said device case and/or said housing case; Thus when a fire contacts with said device, it can ignite said fuses which will activate the activation module to set off the extinguisher.

According to another embodiment of the present disclosure, there is provided a smart fire extinguisher system comprising: a plurality of smart fire extinguisher devices capable of communicating with each other directly in a point-to-point manner or through a network; wherein all devices in said system bear certain same characteristics; wherein each device in said system keeps a record of other devices in the system; wherein when a first device in said system detects a fire hazard, it can use its record to notify other devices of the location and other information related to the fire hazard, whereupon receiving notifications from said first device, other devices, regardless of whether detect any fire hazard, activate alarms (by audio and/or other means) to warn people about the fire hazard and further notify other devices on its record about the fire hazard; wherein said certain same characteristics can be proximity such as in the same local fire-impact zone (310), or owned and/or managed by the same owner (such as an individual or an organization), or other characteristics.

This allows when one device detects a fire, all devices in the same system get notified about the fire. For example, when one device in an apartment unit detects a fire, devices in other units in the same apartment building can sound alarms. In another example, a house can install multiple devices that belong to the owner. When one detects a fire, all the rest will sound alarms.

According to another embodiment of the present disclosure, the aforementioned smart fire extinguisher system may further comprise: at least one wired or wireless network; a plurality of smart fire extinguisher devices connected to said network; one or more computing servers connected to said networks; one or more end-user interfaces (such as mobile apps, PC applications, web applications, browsers, etc.) running on end-user equipment (such as PCs, mobile phones, wearables, AR and VR equipment, etc.), connected to said networks; one or more service providers connected to said networks; and one or more service subscribers connected to said networks. This allows a smart fire extinguisher system to be connected and distributed across networks.

According to another embodiment of the present disclosure, there is provided a smart firefighting service platform comprising: at least one wired or wireless network (such as a WAN, a LAN, or a cellular network, etc.) connected by and running over one or more network infrastructures (such as phone lines, cables, fiber optical lines, satellite links, etc.); at least one computing server connected to said network and capable of running a variety of software, algorithms, applications, and models (such as data analysis, data processing, database, data storage, AI models, decision models, etc.); at least one registered smart fire extinguisher device; whereby said service platform provides services comprising: register devices to said service platform; manage devices and form one or more smart fire extinguisher systems; generate reports, profiles, models, and software/firmware for said devices; receive and collect data from said devices; monitor device status to determine whether critical conditions occur and responsive actions to take using a variety of models, algorithms, and softwares; process and analyze collected data to generate historical data patterns for each device; predict fire hazards for each device using algorithms and AI models using current and historical data patterns collected from said device, all devices in the same fire-impacted zone where said device is, and all devices on said service platform; send commands and data (including updated profiles) to said device, including commands to sound alarms and/or to set off extinguishers to put out fires; store data and analytic results; and wherein said conditions may include: a warning condition or a fire presence condition both based on a set of pre-set logic and profile, and extinguisher activated condition, etc.; wherein said actions and commands may include: activate extinguishers and activate alarms, etc.; wherein said data may include: sensor data; device profile, rules and criteria on critical conditions; software/firmware, models, algorithms, etc.

According to another embodiment of the present disclosure, the aforementioned smart firefighting service platform may further comprise: one or more registered end users; one or more registered end user interfaces (i.e. software) (such as PC applications, firmware, mobile applications, etc.) running on end user equipment (i.e. hardware devices, such as PCs, mobile phones, tablets, wearables, etc.) allowing device owners and end-users to monitor and interact with the device, and one or more registered service providers and/or service subscribers (such as fire stations, fire departments, home security monitoring companies, insurance companies, etc.); whereby services provided by said service platform may further comprise: communicate with registered fire extinguisher devices, end users interfaces, service subscribers, service providers, and other hardware and software registered with said service platform, to send and receive data; monitor and determine device status using a variety of models and algorithms; report device status to registered users, service subscribers, and service providers; receive commands from end user interfaces; send commands and data (including updated profiles) to said device connect service providers to provide services to end-users; send data to service subscribers; wherein said data and commands may include but are not limited to: a fire warning, a fire presence, extinguisher activated, device status, device sensor values, device battery level, fire warning or presence reported by devices in the same fire-impact zone, device history report, and device profiles containing criteria used to determining fire warning or fire presence conditions.

According to an embodiment of the present disclosure, the smart fire extinguisher device has an outer housing case that can be a variety of shapes and sizes and also has an aesthetic appearance that makes the device looks like a decorative item (such as a painting or mural hanging on a wall or decoration item hanging over a ceiling). Compared to portable handheld fire extinguishers, this aesthetic appearance makes the device under the current disclosure fitter with indoor decors. In addition, it can be easily mounted to walls or ceilings without retrofitting the existing building structure. When hanging on a wall or over a ceiling as in kitchens, study rooms, and bedrooms, the device will just look like a decoration without being an eyesore or looking unfitting. Consequently, people would be more willing to deploy said device close to potential fire sources rather than hiding it in a cabinet.

According to an embodiment of the present disclosure, the outer housing case of the smart fire extinguisher device can be replaced to fit a new environment while the inner device can be reused. The outer case can also hold multiple modules at flexible locations inside the housing case. Adding extinguisher modules can increase the extinguisher powder amount and hence the fire extinguishing effects. Adding more detection modules can increase fire detection accuracy.

According to an embodiment of the present disclosure, the extinguisher unit and the control unit inside the smart fire extinguisher device are connected as independent components and can be replaced without affecting each other. This makes the control unit reusable. Once activated, only the extinguisher unit needs to be replaced. It also reduces recharge and replacement that are normally needed for current residential handheld fire extinguishers.

According to an embodiment of the present disclosure, the smart fire extinguisher device can spontaneously release fire-extinguishing agents towards a pre-designated direction. As the fire-extinguishing agents are concentrated towards one direction and are released at a much faster speed, the powder can reach a much higher concentration and is far more effective in extinguishing fires than handheld fire extinguishers.

According to an embodiment of the present disclosure, the smart fire extinguisher device combines fire detection, fire alerts, and automatic fire extinguishment in one affordable device. It can automatically, without any human involvement, respond to fires and spontaneously release extinguishing chemical powders to extinguish fires when a fire is detected. This is more advantageous than smoke detectors and handheld fire extinguishers both require human involvement to extinguish fires.

According to an embodiment of the present disclosure, the smart fire extinguisher device can connect to end user devices such as mobile phones to remotely alert users and take user responses when a fire alert or a fire presence condition is detected by the device. This helps reduce false alarms commonly generated by smoke detectors and allow users to react to fires even when they are remote from fire scenes.

According to an embodiment of the present disclosure, the smart fire extinguisher device can have multiple sensors and different kinds of sensors. This increases fire detection accuracy. The device can also integrate with existing smoke detectors to pick up the alarm generated by smoke detectors. It can also act as a home monitoring device with onboard audio sensors, motion sensors, and video cameras.

As illustrated in multiple embodiments of the present disclosure, the smart fire extinguisher device can activate and extinguish fires in multiple ways. First, people can manually press the button or a switch on the device or throw the device into a fire to activate the extinguisher. Second, the device is IoT enabled and can connect to other IoT devices in close proximity or over the internet. It allows remote control over the internet or through mobile phones. A user can remotely activate the extinguisher by tapping a button through a mobile app. Third, the service platform, with more powerful network computing servers, can run a variety of algorithms and models (including AI models) to recognize patterns, predict fire hazards, and determine whether a fire arises. The servers can preempt and command the device to activate the extinguisher to extinguish fires in a very early stage. Lastly, the device can work autonomously. That is even when there are no human inputs or connected to WiFi or network or any other devices, the device can activate its extinguisher to put out fires using its onboard software and sensor readings. These features allow the device to be used in multiple ways and make it more effective in response to fires.

According to an embodiment of the present disclosure, the smart fire extinguisher device can form a smart fire extinguisher system wherein all devices share the same characteristics and can work together as a system to provide system-wide fire detections and alerts. For example, all devices deployed in a same house can form a system. They can notify each other and sound alarms when one device detects a fire hazard. All devices in a building can form a system and when one device detects a fire hazard, all other devices in the same building can be notified to provide early advanced fire warnings and alerts. This increases the distance of sounding alarms and provides advanced fire alerts, making firefighting using the device more effective.

According to an embodiment of the present disclosure, the smart fire extinguisher device, using its onboard audio sensors, can detect and recognize the high pitch alarm sound generated by smoke detectors. It can then alert users on mobile phones. This enhances the functionality of existing smoke detectors and provides a remote alert to users.

According to an embodiment of the present disclosure, the smart fire extinguisher device can have multiple models with some having more detection modules and others having more extinguisher units. Customers can choose a mix of different models as needed. For example, only an alarm model may be needed in a bedroom for hearing alarms when fires happen in the kitchen, while one standard model and an extra extinguisher model device are installed next to the kitchen stove to add more extinguishing power. This flexibility helps reduce costs and achieve better firefighting effects.

According to an embodiment of the present disclosure, the smart firefighting service platform has powerful computing servers which are capable of running sophisticated algorithms, AI models, decision models, and other models, to process big data based on different criteria such as data collected from a particular device, or from devices in the same fire-impact zone, or from devices owned by a same owner, or from all devices, or data collected across different time period, to perform pattern recognition, fire hazard prediction, and fire detection and determination. The data collection, analysis, predictions, determinations, and decisions can be performed for each individual device connected to the service platform to generate individualized monitoring, alerting, and extinguishing decision. This provides intelligence capability for better detection and prediction in extinguishing fires and even the capability to preempt and prevent fires. Existing smoke detectors and handheld fire extinguishers do not have such advanced capabilities.

According to an embodiment of the present disclosure, the smart firefighting service platform can generate and send individualized profiles, algorithms, models, configuration parameters, and sensor detection patterns to a device. This improves the accuracy of predictions and activation decisions for better firefighting.

According to an embodiment of the present disclosure, the smart firefighting service platform offers the flexibility to add service providers and subscribers who can provide more services and value to device owners. Service providers and subscribers can offer more service to customers (device owners) through the service platform.

According to an embodiment of the present disclosure, the smart firefighting service platform can support both real-time synchronized responses and asynchronized responses. This improves customer experience and firefighting capacity.

According to an embodiment of the present disclosure, the smart firefighting service platform can support multiple levels of decisions for activating the extinguisher. Users can enter activation decisions through a mobile app. The service platform, using its AI and decision models, can independently decide whether the extinguisher needs to be activated even when a user failed to respond on the app or the app fails to respond. The device itself, with onboard and updated algorithms and data, can decide whether to activate the extinguisher, even when there is no response from the network servers (such as when a connection is down or the user or network server fails to respond) or when the device is not even connected to a network. The device-level response guarantees that the device will respond to a fire. The user and service platform response can help to activate the extinguisher to preempt a fire hazard or respond to an early warning.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. AI so, while processes or blocks are at times shown as being performed in series, these processes or blocks may instead be performed or implemented in parallel, or may be performed at different times. Further, any specific numbers noted herein are only examples; alternative implementations may employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in the text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but the use of the term "for" in any other context is not intended to invoke treatment under 35 U.S.C. § 112(f). Accordingly, the applicant reserves the right to pursue additional claims after filing this application to pursue such additional claim forms, for other aspects of the technology in either this application or in a continuing application.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fire extinguishing device comprising:

an outer housing case;

an extinguisher unit disposed in the outer housing case, the extinguisher unit comprising an extinguisher agent container containing a fire-extinguishing chemical agent;

an activation assembly comprising a pressure-generating actuator coupled to the extinguisher agent container and configured, when activated, to generate pressure to release the fire-extinguishing chemical agent from the extinguisher agent container;

a controller disposed in the outer housing case, the controller comprising a computing processor and a memory storing instructions that, when executed by the computing processor, cause the controller to transmit an activation signal to the activation assembly to activate the activation assembly;

at least one fuse having a first end coupled to the activation assembly and a second end coupled to or exposed at a surface of the outer housing case;

wherein the activation assembly is configured to be activated by either the activation signal transmitted by the controller or ignition of the at least one fuse;

wherein ignition of the at least one fuse activates the activation assembly without requiring operation of the controller;

wherein the extinguisher agent container comprises one or more pressure-directing container walls and a release-facing side, the one or more pressure-directing container walls being configured to direct pressure generated by the activation assembly toward the release-facing side; and a frangible release portion of the outer housing case positioned adjacent to the release-facing side, wherein the frangible release portion is configured to rupture in response to pressure generated by the activation assembly to form a discharge opening sized to permit rapid bulk discharge of the fire-extinguishing chemical agent through the discharge opening in a pre-designated direction.

2. The fire extinguishing device of claim 1, wherein the extinguisher agent container comprises a container body configured to direct pressure generated by the activation assembly toward the release-facing side to facilitate rapid bulk discharge of the fire-extinguishing chemical agent through the discharge opening.

3. The fire extinguishing device of claim 2, wherein the container body has a three-dimensional pressure-directing configuration that directs pressure generated by the activation assembly toward the release-facing side to discharge the fire-extinguishing chemical agent through the discharge opening, and wherein the three-dimensional pressure-directing configuration includes a bowl-shaped, cone-shaped, concave, pyramidal, cylindrical, or partially spherical configuration.

4. The fire extinguishing device of claim 1, wherein the activation assembly is positioned on one side of the fire-extinguishing chemical agent opposite the release-facing side and is configured, when activated, to drive the fire-extinguishing chemical agent toward the release-facing side and through the discharge opening.

5. The fire extinguishing device of claim 1, wherein the frangible release portion is configured to rupture to expose a release-facing opening of the extinguisher agent container.

6. The fire extinguishing device of claim 1, wherein the frangible release portion comprises a removable frangible cover of the outer housing case, the removable frangible cover being positioned over the release-facing side of the extinguisher agent container and being removable from the outer housing case for replacement after rupture.

7. The fire extinguishing device of claim 1, wherein the outer housing case comprises:

a mounting surface configured for attachment to a wall or ceiling adjacent to a potential fire source; and a manually actuatable switch disposed on a surface of the outer housing case;

wherein the controller is configured to:

initiate a countdown of a configurable delay period after actuation of the manually actuatable switch;

cause an audible warning to be output during the countdown;

transmit the activation signal to the activation assembly after expiration of the configurable delay period; and cancel transmission of the activation signal if the manually actuatable switch is actuated again during the configurable delay period.

8. The fire extinguishing device of claim 1, further comprising one or more internal walls disposed in the outer housing case and forming a protected compartment containing the controller and configured to contain one or more additional components of the fire extinguishing device, wherein the one or more internal walls separate the protected compartment from the extinguisher unit and are configured to protect one or more components disposed in the protected compartment from heat, debris, or pressure generated during activation of the activation assembly.

9. The fire extinguishing device of claim 8, wherein the extinguisher unit is removable from the outer housing case and replaceable while the controller remains installed in the protected compartment.

10. The fire extinguishing device of claim 9, further comprising an electrical connector configured to electrically couple the controller to the activation assembly when the extinguisher unit is installed in the outer housing case, wherein removal of the extinguisher unit from the outer housing case disconnects the activation assembly from the controller while the controller remains installed in the protected compartment.

11. The fire extinguishing device of claim 10, wherein the frangible release portion comprises a removable frangible cover of the outer housing case positioned over the release-facing side of the extinguisher agent container, and wherein, after activation of the activation assembly that ruptures the removable frangible cover, the fire extinguishing device is reusable by replacing the extinguisher unit and the removable frangible cover while retaining the controller in the protected compartment.

12. The fire extinguishing device of claim 1, wherein the outer housing case is configured to receive a plurality of removable extinguisher units, each removable extinguisher unit comprising a respective extinguisher agent container, a respective activation assembly, a respective fuse having a first end coupled to the respective activation assembly and a second end coupled to or exposed at a surface of the outer housing case, and a respective release-facing side positioned adjacent to a respective frangible release portion of the outer housing case configured to rupture to form a respective discharge opening when the removable extinguisher unit is installed in the outer housing case; and wherein the outer housing case is configured such that a number of removable extinguisher units installed in the outer housing case is selectable based on an intended deployment environment to adjust the extinguishing capacity or coverage area of the fire extinguishing device.

13. The fire extinguishing device of claim 12, further comprising at least one sensor assembly, wherein the controller is configured to transmit an activation signal to one or more respective activation assemblies associated with the one or more removable extinguisher units based on one or more sensor values detected using the at least one sensor assembly.

14. The fire extinguishing device of claim 1, further comprising at least one sensor assembly comprising at least one of a temperature sensor, smoke sensor, flame sensor, gas sensor, audio sensor, image sensor, infrared sensor, or photoelectric sensor.

15. The fire extinguishing device of claim 14, wherein the memory stores instructions that, when executed by the computing processor, cause the controller to collect sensor values from the at least one sensor assembly according to a stored configurable sampling schedule and determine whether or when to transmit the activation signal to the activation assembly based at least in part on the collected sensor values and one or more stored fire-detection thresholds or activation parameters.

16. The fire extinguishing device of claim 14, wherein the at least one sensor assembly comprises an audio sensor configured to detect an alarm sound emitted by a separate smoke detector.

17. The fire extinguishing device of claim 1, further comprising at least one wireless transceiver configured to transmit, from the fire extinguishing device to a remote device, device-generated data, device-collected data, and current device configuration data, and receive updated device configuration data from the remote device.

18. The fire extinguishing device of claim 17, wherein the memory stores instructions that, when executed by the computing processor, cause the controller to transmit a fire alert to the remote device, receive a response from the remote device, and transmit the activation signal to the activation assembly based at least in part on the response.

19. The fire extinguishing device of claim 18, wherein the memory stores instructions that, when executed by the computing processor, cause the controller to wait for the response during a predetermined response period; transmit the activation signal to the activation assembly when the response comprises an activation response; refrain from transmitting the activation signal to the activation assembly when the response comprises a response preventing activation; and transmit the activation signal to the activation assembly when a fire condition persists and no response preventing activation is received during the predetermined response period.

20. The fire extinguishing device of claim 17, further comprising at least one sensor assembly, wherein the controller is configured to transmit a fire alert through the at least one wireless transceiver when the controller detects a fire condition based at least in part on one or more sensor values from the at least one sensor assembly, and wherein ignition of the at least one fuse activates the activation assembly without requiring operation of the controller, communication with the remote device, or communication with a remote server.

* * * * *